US008510163B2

(12) United States Patent
Hess et al.

(10) Patent No.: US 8,510,163 B2
(45) Date of Patent: Aug. 13, 2013

(54) CHECKOUT QUEUE VIRTUALIZATION SYSTEM FOR RETAIL ESTABLISHMENTS

(75) Inventors: Basil Hess, Zurich (CH); Felix von Reischach, Zurich (CH); Juliana Sutanto, Zurich (CH)

(73) Assignee: SAP AG, Walldorf (DE)

( * ) Notice: Subject to any disclaimer, the term of this patent is extended or adjusted under 35 U.S.C. 154(b) by 15 days.

(21) Appl. No.: 13/277,938

(22) Filed: Oct. 20, 2011

(65) Prior Publication Data

US 2013/0103486 A1 Apr. 25, 2013

(51) Int. Cl.
*G06Q 30/00* (2012.01)

(52) U.S. Cl.
USPC .............. 705/14.38; 705/14.11; 705/14.16; 705/14.29

(58) Field of Classification Search
USPC ...................................................... 705/14.38
See application file for complete search history.

(56) References Cited

U.S. PATENT DOCUMENTS

| | | | | |
|---|---|---|---|---|
| 4,398,257 | A * | 8/1983 | Paganini et al. | 713/300 |
| 5,083,638 | A | 1/1992 | Schneider | |
| 5,168,961 | A | 12/1992 | Schneider | |
| 6,059,184 | A * | 5/2000 | Ahlstrom et al. | 235/375 |
| 6,173,209 | B1 | 1/2001 | Laval et al. | |
| 7,720,718 | B2 | 5/2010 | Hale et al. | |
| 2004/0076282 | A1 * | 4/2004 | Leijonhufvud | 379/265.02 |
| 2009/0076875 | A1 * | 3/2009 | Lert et al. | 705/8 |

OTHER PUBLICATIONS

"Number of Cell Phones Worldwide Hits 4.6B", CBS News, Feb. 18, 2010, found on line at www.cbsnews.com/2100-500395_162-6209772.html.*

"Family & Friends Certificate Travel", Delta Air Lines, Inc., Nov. 20, 2002, found on line at dlfcret.org/1017.pdf.*

"Fastpass", Intercot: Walt Disney World Inside & Out, 2009, found on line at www.intercot.com/themeparks/tickets/fastpass/default.asp.*

Kleinrock, "Optimum Bribing for Queue Position", Operations Research, vol. 15, No. 2, Mar.-Apr. 1967, pp. 304-318.* http://bignews.biz/?id=969522 (2011). Average Briton Spends 1 Month Queuing in Supermarkets in Lifetime Published Date: Feb. 4, 2011.

R. East et al. (1994). Decision making and habit in shopping times, European Journal of Marketing.

Barklays Bank (2010). Britain isn't Queuing. Released on Apr. 8, 2010.

Welt Online (2008). Deutsche müssen lange an der Supermarktkasse warten: http://www.welt.de/welt_print/article2515898/Deutsche-muessen-lange-an-der-Supermarktkasse-warten.html Jan. 1, 2008.

J. Vijayan, Computerworld (2011), Analysts: Apple could disrupt mobile payment industry. Jan. 28, 2011.

(Continued)

*Primary Examiner* — John G Weiss
*Assistant Examiner* — Scott C Anderson
(74) *Attorney, Agent, or Firm* — Fountainhead Law Group PC

(57) ABSTRACT

Disclosed is a system and mechanism that virtualizes a physical queue in a retail establishment. Customers using this system have the ability to indicate they would like to pay now (i.e., enter the virtual queue) using a button on their mobile device, and then they continue shopping until the mobile device informs them to proceed to a checkout counter. In addition, the system implements features that address users waiting in the queue. One feature is about transactions within the queue. This means that customers can buy priority using their mobile device, while waiting. Another feature is targeted advertisement and recommendation of products, leading to increased impulsive purchases.

16 Claims, 16 Drawing Sheets

(56) References Cited

OTHER PUBLICATIONS

QuickQ, http://www.ctronix.com/DigiQ.htm. Printed on Sep. 16, 2011.
Disney FASTPASS: http://disneyland.disney.go.com/plan/guest-services/fastpass. Printed on Sep. 16, 2011.
Zaarly: www.zaarly.com. Printed on Sep. 16, 2011.
A. Watters, (2011). Zaarly: Is this the future of mobile money and markets? Mar. 9, 2011.
ShopSavvy: www.shopsavvy.mobil/ Mobile Shopping. Printed on Sep. 16, 2011.
RedLaser: www.redlaser.com, printed on Sep. 16, 2011.
Barcoo: www.barcoo.com, Printed on Sep. 16, 2011.
GS1 (2010). Mobile in retail—getting your retail environment ready for mobile. Technical report, GS1.
eBay Mobile Web: http://mobile.ebay.com, priinted on Sep. 16, 2011.
Craigslist: http://www.craigslist.org Printed on Sep. 16, 2011.
Resnick et al. (1994). GroupLens: An open architecture for collaborative filtering of netnews. In Proceedings of the 1994 Computer Supported Cooperative Work Conference. pp. 175-186. 1994.
Terveen L., et al., (1997). PHOAKS: a system for sharing recommendations. Communications of the ACM, 40 (3):59-62.
W. Hill et al., G. (1995). Recommending and evaluating choices in a virtual community of use. In Proceedings of the SIGCHI conference on Human factors in computing systems (CHI '95).
M. Balabanovic et al. (1997). Fab: content-based, collaborative recommendation. Communications of the ACM, 40 (3):66-72. Mar. 1997.
Pazzani, M. J. (1999). A framework for collaborative, content-based and demographic filtering. Artificial Intelligence Review, 13(5-6):393-408.
http://www.supalocal.com/how-it-works. Printed on Oct. 20, 2011.

* cited by examiner

CHECKOUT QUEUE VIRTUALIZATION SYSTEM FOR RETAIL ESTABLISHMENTS

BACKGROUND

The present invention relates to checkout systems, and in particular to virtualization of checkout lines (queues) in a retail establishment.

Unless otherwise indicated herein, the approaches described in this section are not prior art to the claims in this application and are not admitted to be prior art by inclusion in this section.

Queuing at checkout counters seems to be an unavoidable part in the daily shopping experience. A study by a British online discount store revealed that the average Briton spends one month queuing during his lifetime. Recent market research data indicates that in Germany on average 4.72 customers are waiting in supermarket lines, leading to an average waiting time of seven minutes.

For the majority of shoppers, queuing is perceived to be bothersome. A study reveals that 35% of shoppers strongly dislike queuing, 31% of shoppers dislike it, 21% "mind a little" and only 13% do not mind. Even more interesting is that 80% of the shoppers polled indicated that they are likely to avoid shopping during busy times, and the study gives evidence that they actually do so. Another study showed the impatience even of those usually thought to be "queue-tolerant": 68% of the customers regularly abandon shopping if they have to wait too long. The upper waiting time limit of two-fifths of the surveyed participants is set to only two minutes. In comparison, the average waiting time in most countries is above two minutes. Remarkable also is the effect of spotting long queues by customers who enter a supermarket. In the above-mentioned study, 51% refuse to even enter the store if they spy a queue.

Related technologies and applications can be found in the domains of (i) checkout mechanisms, (ii) mobile transactions and (iii) recommender systems.

Checkout mechanisms: Methods related to the "checkout-experience" have received much attention in the past, but only few of them exploit the possibilities of mobile devices. In U.S. retail chains like Wal-Mart®, there are so-called "self check-out" counters. Here, the customer has to scan each item manually and pay at the terminal and therefore contribute individually to the system's efficiency. Other approaches aim at improving the payment efficiency. After a high enough adoption rate of near-field communication (NFC), mobile payment and the mobile wallet approaches are generally thought to be the future way. Another approach to improve checkout is fully automatic checkout, where the items are put in a smart basket, where they are recognized, for example, using radio frequency ID (RFID) technology. Connected with a mobile payment system, queuing would almost be completely avoided. Other approaches aim at converting physical to virtual queues, where customers take a ticket and wait until their number is displayed on a screen. For example this approach is deployed in the Swiss Post offices. An application for virtual queuing in recreational parks is Disney FASTPASS™, which envisions to enable mobile devices to make reservations for attractions in advance.

Mobile transactions: Traditional platforms for transactions between internet users include eBay™ or Craigslist™, which are also accessible with smart phones. Zaarly™ is a location-aware mobile market place, where anyone can publish a request for some good or service, which includes a money bid and location requirements. Although only existing as an idea so far, it is believed by some to be the future of mobile markets, or even the next big thing in mobile commerce. Although a very new area, it is apparent that mobile transactions will be a hot topic in the future.

Recommending/targeting systems: Systems that help assist customers while shopping have been researched extensively, where most solutions are store-independent. Systems like ShopSavvy™, RedLaser™ and Barcoo™ let the user scan an item, and display price comparisons and ratings. Depending on the rating or review, a product may be recommended explicitly. Other systems aim at implicitly recommend items based on the user's profile or previous behavior. Collaborative systems like GroupLens™, PHOAKS™ and Video Recommender™ find users with similar tastes and recommend what they liked in the past. A prominent example is the product recommendation provided by Amazon®. Content based systems identify items similar to those preferred in the past. They are especially suited for textual information like news. GS1™ envisions product recommendations and targeting to be integrated in an integrated retail solution.

SUMMARY

In accordance with embodiments a checkout processing system in a retail establishment includes transmitting a checkout request message from a customer to initiate checkout processing. In embodiments, the customer's mobile device may transmit the checkout request message to a queue manager. A queuing message is received, having information indicative of the customer's assigned position in a checkout queue. A queue transaction may be conducted between the customer and one or more transactors. The queue transaction may include an offer that specifies a new position in the checkout queue. The queue transaction may be conclude with the customer swapping queue positions with someone who accepted the offer.

The queue transaction may be initiated by the customer. In embodiments, the queue transaction may be initiated by the retailer.

In embodiments, the customer may receive an offer from another customer. The customer may accept the offer. The queue transaction may then conclude with the two customers swapping their respective queue positions.

While the customer is in the checkout queue, their mobile device may receive advertisements or other information relating to purchase opportunities of goods in the retail establishment.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
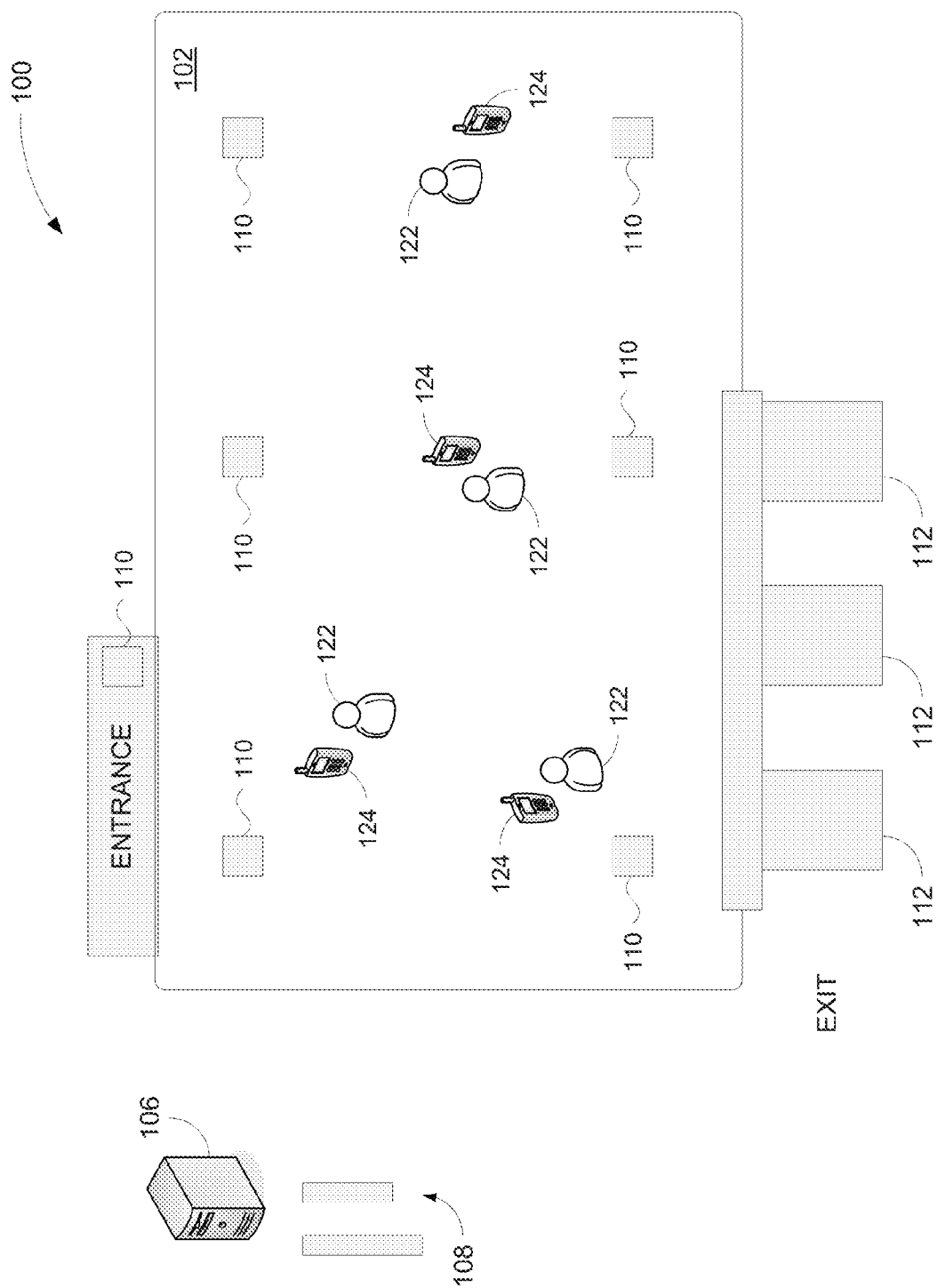
FIG. 1 is a system level view of an embodiment of a virtual checkout queue system in accordance with aspects of the present invention.

Referring to FIG. 1, a representation of a virtual checkout queuing system 100 in accordance with principles of the present invention includes a retail establishment 102. The retail establishment 102 may be any place where retail activity can be conducted. Customers 122 may come and go to browse or shop at the retail establishment 102. A queuing system 106 can track the presence and location of customers 122. For example, customers 122 may handed a card that bears an RFID tag when they enter the premises of the retail establishment 102. RFID monitors 108 may be placed at an entrance of the and throughout the premises to detect and track customers' locations. The queuing system 106 may manage one or more virtual checkout queues 110 in order to manage and direct customers 122 to one or more checkout counters (checkout stations, etc.) 112, including manned cash registers, self checkout stations, and so on. In embodiments, queue management activities performed by the queuing system 106 include managing a database of all customers who are in the retail establishment 102 and may involve communicating with the customers' mobile devices 124 to conduct targeted marketing activities.

Figure 2:
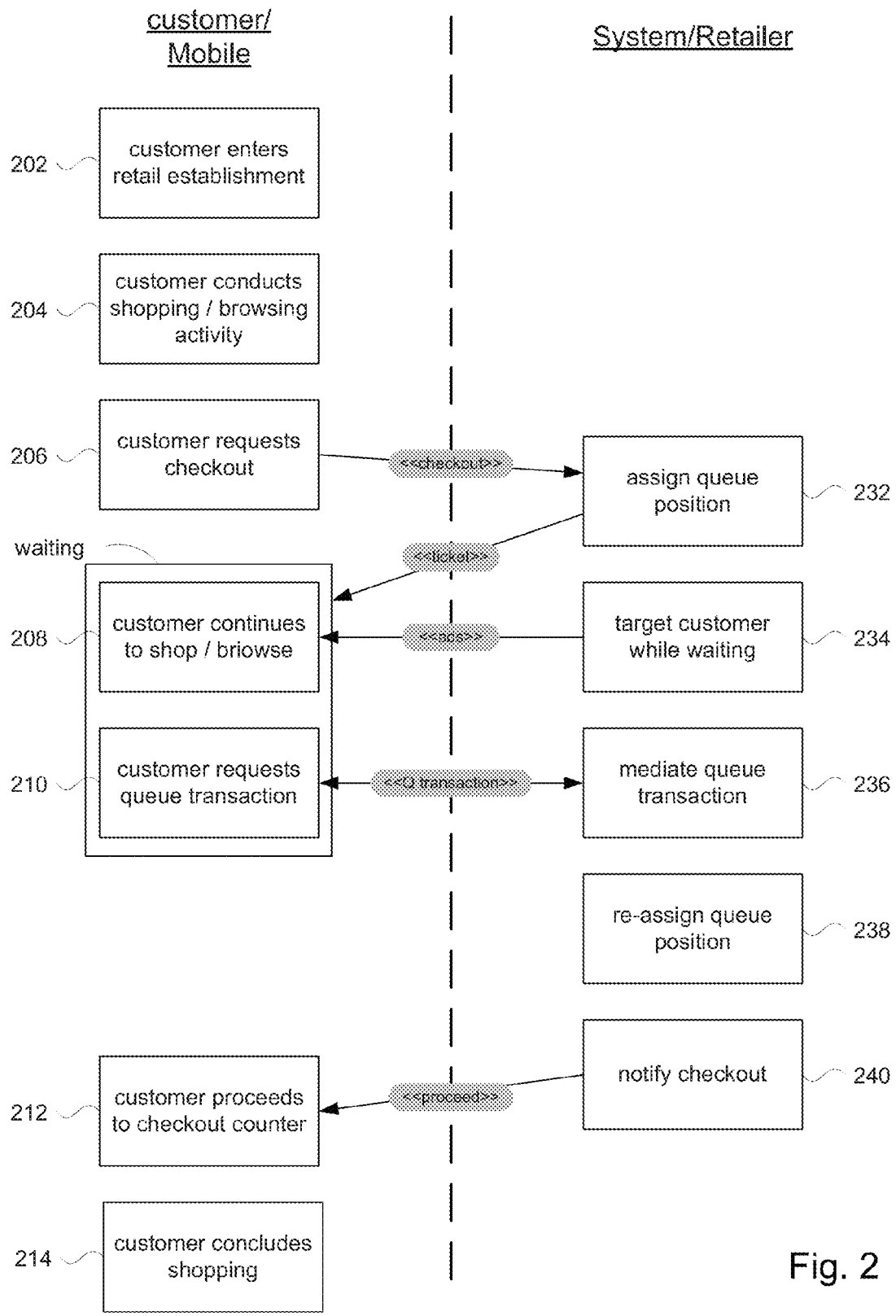
FIG. 2 illustrates a communication exchange between a mobile device and a queue manager.

Referring to FIG. 2 with reference to FIG. 1, a checkout process and communication flow in accordance with principles of the present invention is illustrated. Thus, at a step 202 a customer 122 enters the retail establishment 102. In embodiments, the presence of the customer 122 may be registered with the retailer's queue management system 106 in order to conduct queue management with the customer. Registration may be performed explicitly. For example, the customer 122 may be required to register with the queue management system 106 upon entering the retail establishment 102. The customer 122 may present a barcode or some other identifier displayed on their mobile device 124 to a scanner device installed on the premises of the retail establishment 102, and so on. Registration may be indirect; for example, the customer 122 may have a membership card on their possession bearing an RFID device that can be detected as they enter the retail establishment 102, and so on.

Figure 3C:
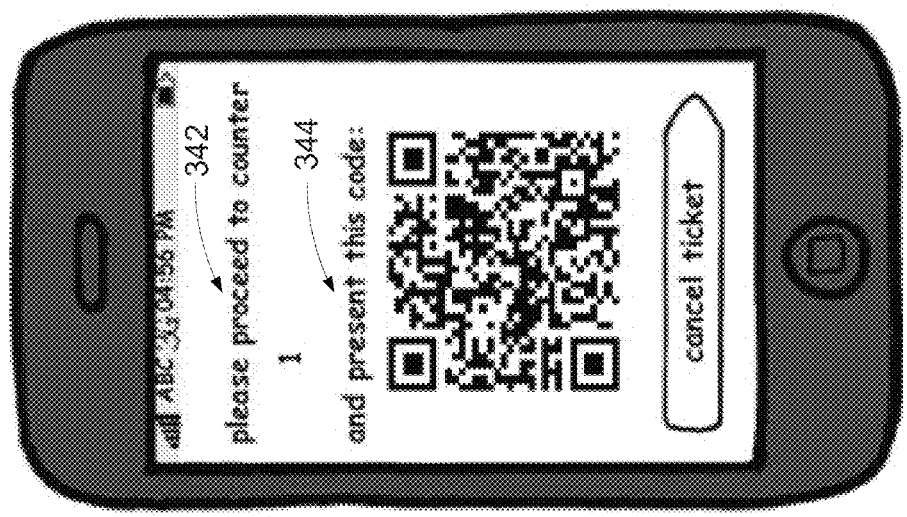
FIGS. 3A-3D illustrate mockups of screen shots of a mobile device operated in accordance with the present invention.
Figure 3B:
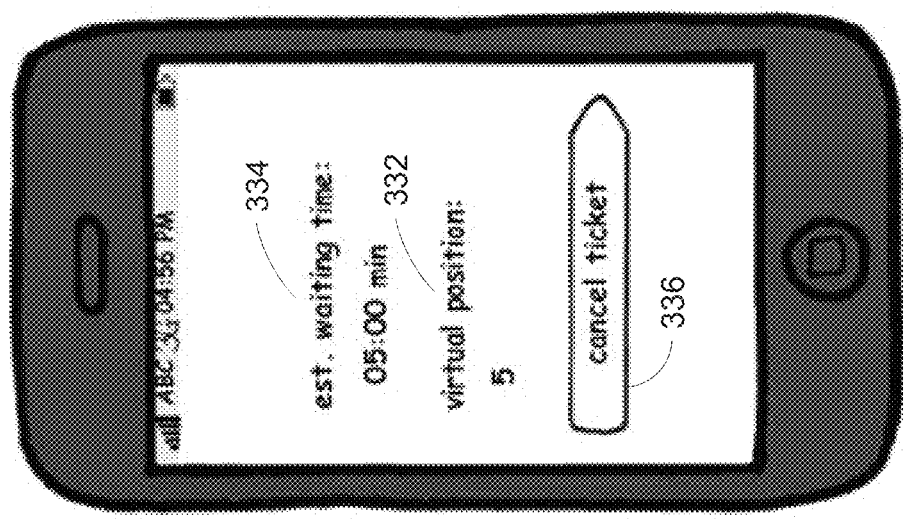
Figure 3A:
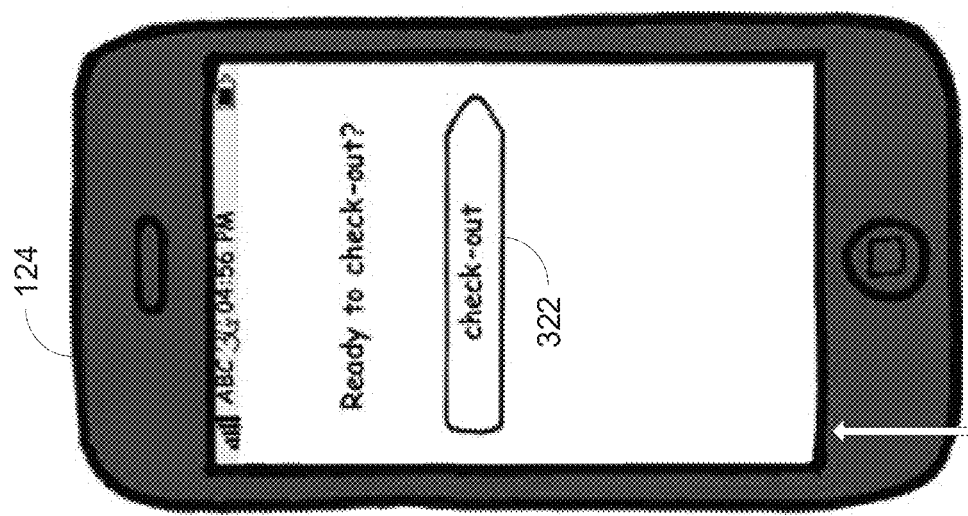

At a step 204, the customer 122 will conduct shopping activity, and at some time will be ready to conclude their shopping. When the customer 122 has finished their shopping, they may access a suitable application on their mobile device 124 to initiate checkout processing, step 206, in accordance with the present invention. FIG. 3A shows an example of a mobile device 124 on which a checkout mobile application 302 has been launched. The checkout mobile application 302, for example, may be provided by the retailer to cooperate with its queue management system 106. FIG. 3A illustrates a checkout button 322 displayed by the checkout mobile application 302 on a display of the mobile device 124. The customer 122 may press the checkout button 322 to send a checkout request message to the queue management system 106.

At a step 232 the queue management system 106 receives the customer's checkout request message and assigns the customer 122 a queue position in the checkout queue. The mobile device 124 may receive a virtual checkout ticket from the queue management system 106. The checkout ticket identifies the customer and their virtual position in a virtual checkout queue. FIG. 3B shows a display 332 of the queue position displayed on the mobile device 124, and may include a display 334 of an estimated wait time. The waiting time may be an approximate value, which may be computed by taking an empirical average dispatch time per customer, for example. A cancel button 336 may be displayed so that the customer 122 can cancel the checkout ticket if they decide to continue shopping rather than checking out.

Figure 2A:
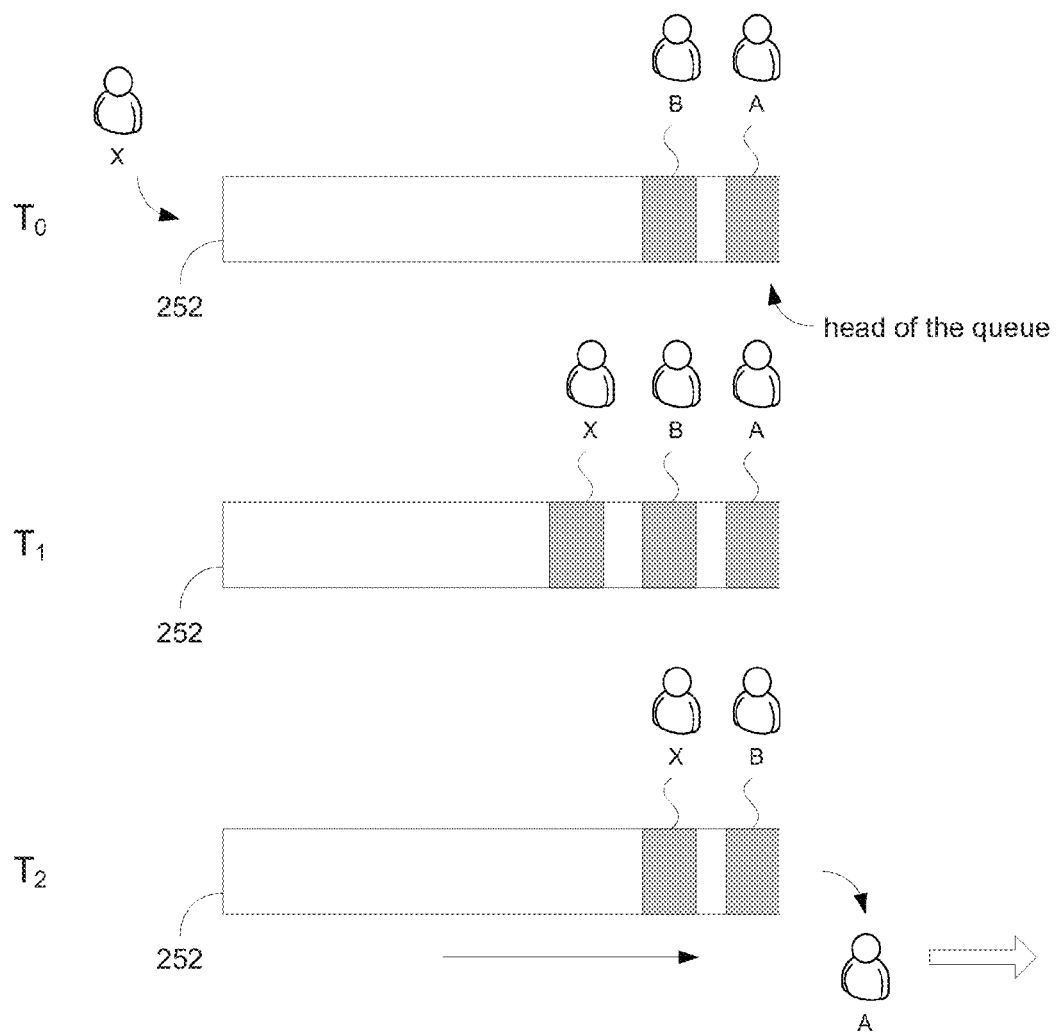
FIGS. 2A and 2B illustrate aspects of a virtual queue in accordance with the present invention.

The queue management system 106 operates in the background and attends to the queue management activities, including moving customers along in the checkout queue. Consider the sequence diagram in FIG. 2A for a moment. In some embodiments, customers who have pressed the checkout button 322 on their mobile devices 124 are put into a single first in, first out (FIFO) queue 252, which is a data structure stored in a memory of a computer. Customers in the checkout queue 252 advance to the head of the queue as a customer is dispatched to a checkout counter to be processed. Thus, at time $T_0$, the checkout queue 252 has two customers A and B. At time $T_1$, customer X is placed in the checkout queue 252. At time $T_2$, customer A is dispatched from the checkout queue 252. Accordingly, remaining customers B and X advance in their position in the checkout queue 252. It may be desirable to ensure that a checkout counter 112 is never idle. Accordingly, in some embodiments the queue management system 106 may dispatch more than one customer at the same time to a given checkout counter 112.

In some embodiments, an in-store locating system may be installed on the premises of the retail establishment 102. For example, as illustrated in FIG. 1, a system of RFID readers 110 may be placed throughout the premises. Accordingly, location information for a customer 122 may be included in the checkout request message that is sent to the queue management system 106 at step 206. The location information may be used to compute or otherwise determine about how long a customer 122 will need to get from their current location to a checkout counter 112, and may then assign the customer to a position in the checkout queue accordingly. For example, suppose a customer 122 is x minutes from the nearest checkout counter 112 when they send a checkout request to the queue management system 106. That customer 122 may be given a position (slot) in the checkout queue that is estimated to require a minimum of x minutes to advance to the head of the queue.

In some embodiments, the number of checkout counters 112 that are open may vary depending on how many customers are in the checkout queue, and how quickly the queue is emptying. The queue management system 106 may automatically open additional checkout counters or close out checkout counters depending on the loading on the checkout queue. Alternatively, a manager of the retail establishment may be informed of the queue loading (e.g., the queue management system 106 may notify the manager) and make a decision whether adjustment of the number of open checkout counters is needed.

Continuing with FIG. 2, at a step 234, when the customer 122 has pressed the checkout button 322, the queue management system 106 may target the customer with occasional ads or recommendations of goods that are usually purchased as impulse purchases, and may include other goods that may be of interest to the customer as the customer continues to browse or shop (step 208) while waiting their turn at a checkout counter.

The virtual queuing method of the present invention is an elegant way to determine when an individual customer is ready to checkout. Purchases that are made after the customer is ready to check out are referred to in the marketing business as impulse purchases (impulse buying, etc.). Such goods are usually located near the checkout counter. However, in accordance with principles of the present invention, the marketing of impulse purchases is no longer restricted to physical proximity to the checkout counter. Instead, the queue management system 106 can send messages to the customer's mobile device informing them of various purchasing opportunities, thus giving more flexibility to the retailer on how and where to place goods. To amplify the recommendation effect to customers, the queue management system 106 may also push coupons to the mobile device 124 that aim at incentive purchases. It will be appreciated that the terms "push", "pushed", and so on refer to "push technology" where a server initiates the communication of data to clients (in this case mobile devices) absent any request from the client for the data.

In accordance with principles of the present invention, the customer may request a queue transaction (step 210) while waiting their turn at a checkout counter. Some customers may be in hurry to be "in and out" of a retail establishment, while other customers may have more time on their hands. In accordance with the present invention, "queue transactions" provide customers with options to address such situations. Queue transactions may be executed between the time a customer presses the checkout button 322 on their mobile device 124 and the time when they notified to proceed to the checkout. The queue management system 106 mediates (step 236) the requested queue transaction. A queue transaction allows a customer to alter their position in the checkout queue (whether toward or away from the head of the queue) in exchange for some form of "currency". In embodiments, there are "explicit transactions" which involve two parties: the customer and a transactor with whom the customer conducts the queue transaction. An "implicit transaction" is one where customers may be automatically prioritized in the queue depending on their status with the retailer. As a result of a queue transaction, the queue management system 106 may re-assign (step 238) the customer's position in the checkout queue.

Queue Transactions: Explicit Transactions

Figure 2B:
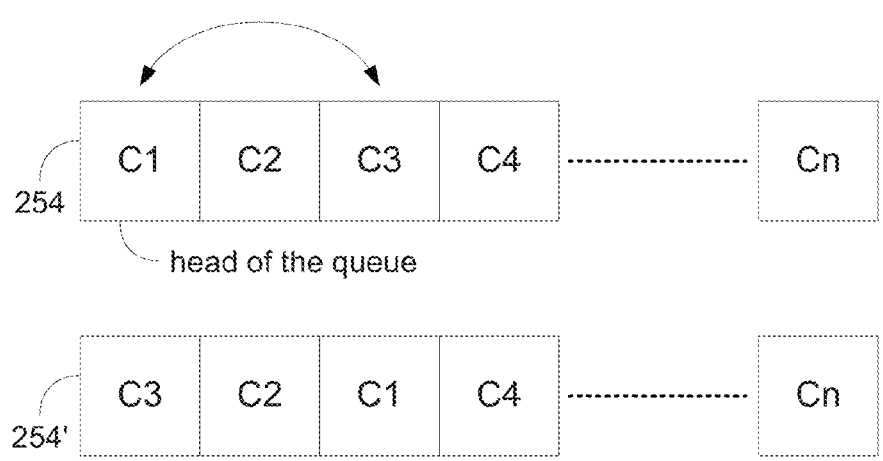

In an embodiment, the "transactor" with whom the customer negotiates in a queue transaction may be one or more customers who are also in the checkout queue. The queue transaction mechanism is fair, since customers who do not participate in the transaction keep their position in the checkout queue. Only transactors who were involved in the queue transaction may have their positions in the checkout queue re-assigned. Referring to FIG. 2B, for example, suppose customer C1 and customer C3 in the checkout queue 254 negotiated to swap positions. If negotiations were successful, the checkout queue 254' would reflect that customer C1 and customer C3 swapped their respective positions in the checkout queue, while the positions of the other customers remain unaffected.

In embodiments, the "currency" that may be used in a queue transaction may include: (i) real money; or (ii) loyalty points. In the example shown in FIG. 2B, customers C1 and C3 negotiate on swapping their positions in the checkout queue 254. Suppose customer C1 is at the head of the queue.

In accordance with principles of the present invention, customer C3 may offer to pay a certain amount of currency to customer C1 in order to swap positions with C1. If customer C1 accepts, then their respective positions in the checkout queue are re-assigned as shown in FIG. 2B. Since the queue management system 106 mediates the queue transaction, the exchange of currency, whether real money or loyalty points, may be reconciled at the checkout counter by the queue management system. For example, if real money (e.g., 1 Franc) was offered by customer C3 and accepted by customer C1, then C3's bill at the checkout counter would include the cost of the goods purchased by C3 plus 1 Franc (Fr). Conversely, C1's bill at the checkout counter would be the cost of the goods purchased by C1 minus 1 Fr. A similar exchange may be performed if the "currency" that was exchanged was loyalty points.

For example, a customer might be in a hurry to catch a train but still want to buy some items from the supermarket. By entering a store with a queue virtualization system in accordance with the present invention, the customer would be able to use the whole time inside the store for shopping, without wasting time for standing in a line. Furthermore, the customer may decide to spend an additional amount of money or loyalty points to conduct a queue transaction in an attempt to get a checkout ticket almost immediately.

Figure 3D:
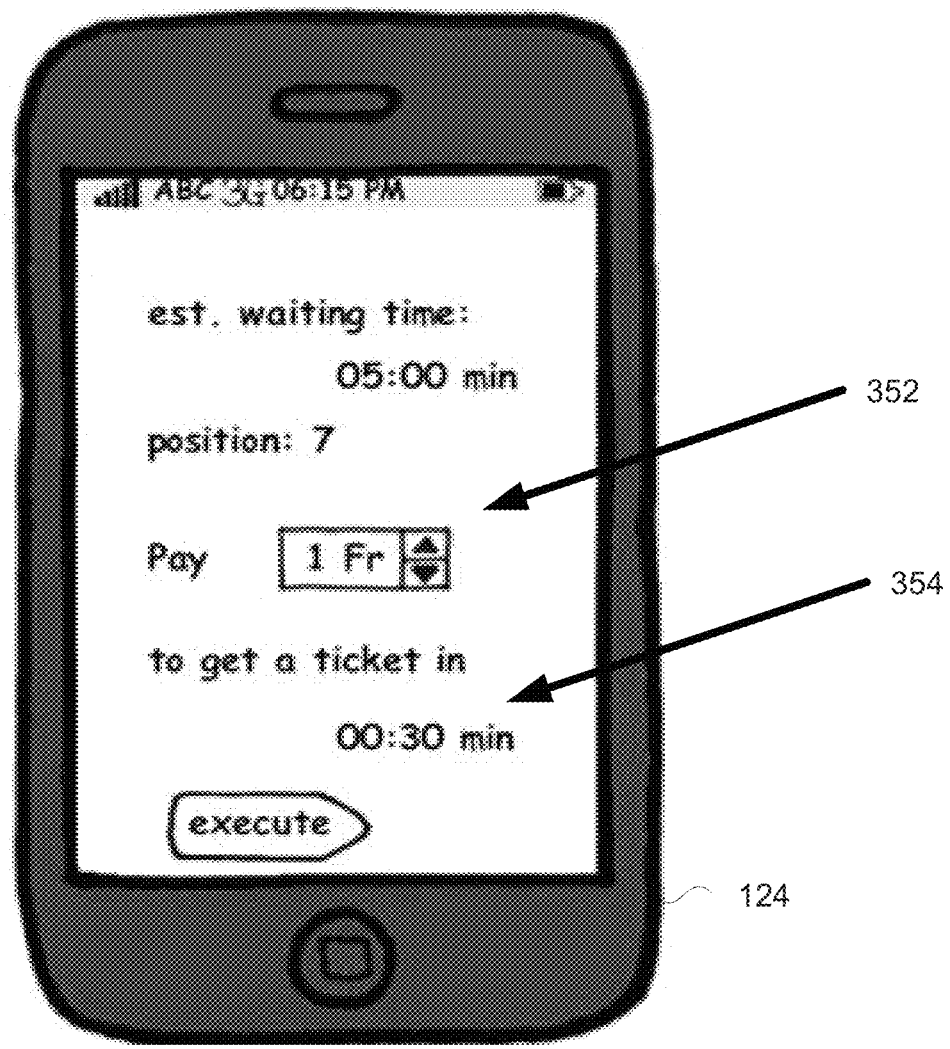

FIG. 3D shows an example of a display on a mobile device 124 that may be used to facilitate queue transactions. The customer may specify how much they willing to pay (area 352) to obtain a certain ticket (area 354). The bid may be sent to the queue management system 106 for distribution to other the mobile devices of customers in the checkout queue. In an embodiment, the offer could go to the first customer (transactor) who accepts the offer. In another embodiment, a bidding (auction) technique may be used where more than one transactor may respond with competing bids. The customer who initiated the queue transaction may accept any one of the responses.

In embodiments, the transactor with whom the customer conducts a transaction may be the retailer rather than other customers. The customer may offer to be re-assigned to a position at the end of the checkout queue in exchange for some form of consideration, whether real money, loyalty points, goods, coupons, and so on. The retailer may accept such an offer in order to move other customers along in the checkout queue. In embodiments, the retailer may initiate a queue transaction rather than a customer, offering a suitable form of consideration to the customer or customers.

In embodiments, a queue transaction may be conducted to bid for opening another checkout counter.

Queue Transactions: Implicit Transactions

In embodiments, if a customer 122 is identified as a "preferred" customer (e.g., they are frequent customers, they spend a lot of money, etc.), that customer may be placed on a special VIP checkout queue. The queue management system 106 may define and manage two (or more) separate checkout queues: one for the "economy shoppers" and one for "frequent shoppers". Each checkout queue may be associated with different sets of checkout counters. For example, an "economy shoppers" checkout queue may be associated with, say, three "economy" checkout counters. The queue management system 106 may always dispatch customers from the economy shoppers checkout queue such that there are always two customers at each economy checkout counter in order to ensure that those checkout counters are always busy. However, customers in a "frequent shoppers" checkout queue may be associated with, say, three "VIP" checkout counters. The queue management system 106 may dispatch customers from the frequent shoppers checkout queue such that there is only one customer at each VIP checkout counter in order to ensure that a customer 122 who is dispatched from the frequent shoppers checkout queue will immediately attention when they arrive at the checkout counter.

Completing the discussion of FIG. 2, the customer 122 is notified (step 240) when it is time for them to proceed to a checkout counter. In an embodiment, the queue management system 106 may send a notification message to the customer's mobile device 124, informing the customer 122 to proceed to the specified checkout counter. Referring to FIG. 3C, the mobile device 124 may display a suitable message 342 that informs the customer which checkout counter to proceed to. The queue management system 106 may also include a user code 344 or some similar information to identify the customer 122 at the checkout counter. For example, in an embodiment the user code 344 may be the same code that was used to identify the customer 122 when they first entered the retail establishment 102. The customer 122 may then proceed to the designated checkout counter (step 212) and conclude their shopping visit (step 214).

Figure 4A:
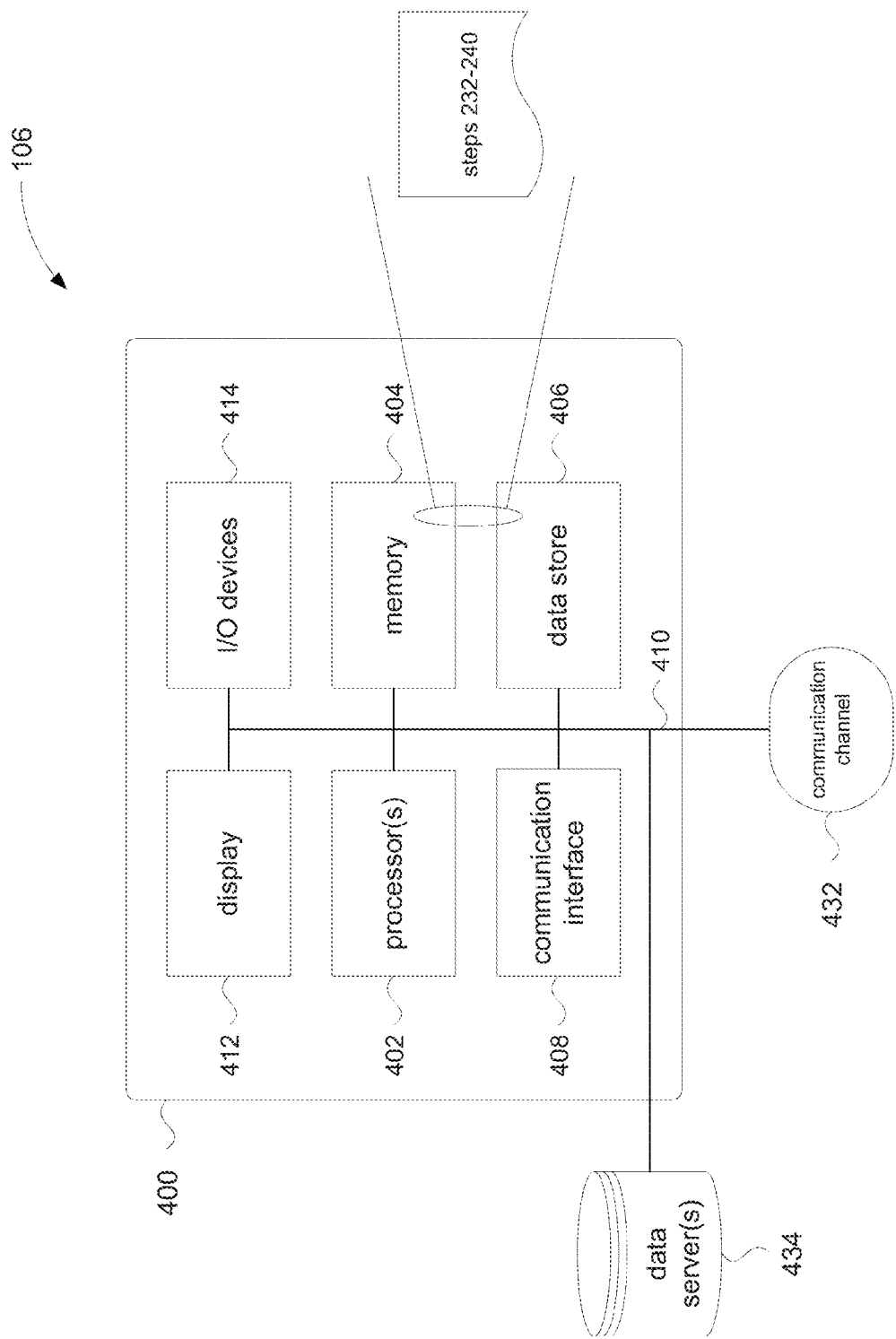
FIG. 4A is a system block diagram of a mobile device.
Figure 4B:
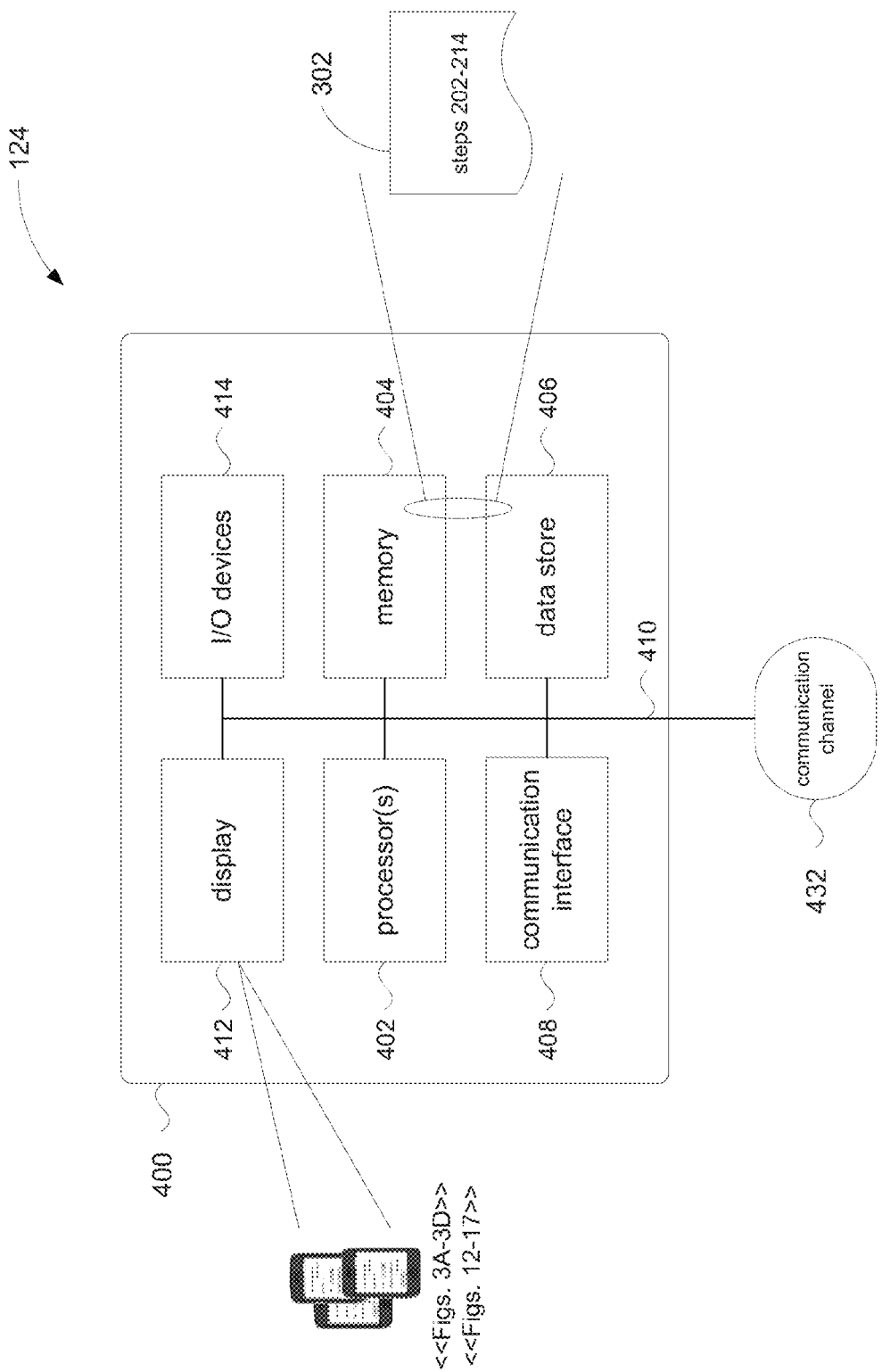
FIG. 4B is a system block diagram of a queue manager.

Referring to FIGS. 4A and 4B, in embodiments, the queue management system 106 and mobile device 124 may comprise conventional computing architectures programmed and otherwise configured to operate in accordance with the principles of the present invention. FIGS. 4A and 4B show a computer system 400 including a data processing subsystem 402 which may comprise one or more data processing units. For example, the data processing subsystem 402 may be a central processing unit (CPU), an application specific IC (ASIC, in the case of a mobile device 124), or any other suitable data processing architecture. A memory subsystem 404 may comprise random access memory (usually volatile memory such as DRAM) and non-volatile memory such as FLASH memory, ROM, and so on. A storage subsystem 406 may comprise one or more mass storage devices such as hard disk drives and the like. The storage subsystem 406 may include remote storage systems; e.g., for data mirroring, remote backup and such. A communication interface 408 may provide communications over a suitable communication channel 432, for example, the Internet, Wi-Fi™, and so on. A system of buses 410 can interconnect the foregoing subsystems, providing control lines, data lines, and/or voltage supply lines to/from the various subsystems.

The computer system 400 may include a suitable display 412 and/or various I/O devices 414. For example, in the mobile device 124, the I/O devices 414 may include a numeric keypad, a physical keyboard, and the like.

Referring to FIG. 4A, in the case of the queue management system 106, the display 412 and I/O devices 414 may include conventional computer monitors and keyboard/mouse input devices. A database or other data store 434 may be used by the queue management system 106 to store queuing information, customer information, advertisements, couponing information, and so on. The data store 434 may be connected to the computer system 400 via a local area network, or the like. The memory subsystem 404 and or the storage subsystem 406 may store computer executable programs which can program the data processing subsystem 402 to cause it to operate in accordance with aspects of the present invention. For example, the queue management system 106 can be programmed to perform step 232-240 as disclosed herein.

Referring to FIG. 4B, in the case of the mobile device 124, the I/O devices 414 may include an RFID tag that interacts with RFID readers 110 set up in the retail establishment 102. Mobile devices include smart phones, personal data assistants (PDAs), computer tablets, and the like. it will be appreciated, of course, that mobile devices may include other portable computing devices that a customer might take with them for shopping. The memory subsystem 404 and or the storage subsystem 406 may store computer executable programs which can program the data processing subsystem 402 to cause it to operate in accordance with aspects of the present invention. For example, the mobile device 124 can be programmed to perform steps 202-214 and provide various display as discussed herein.

Figure 4C:
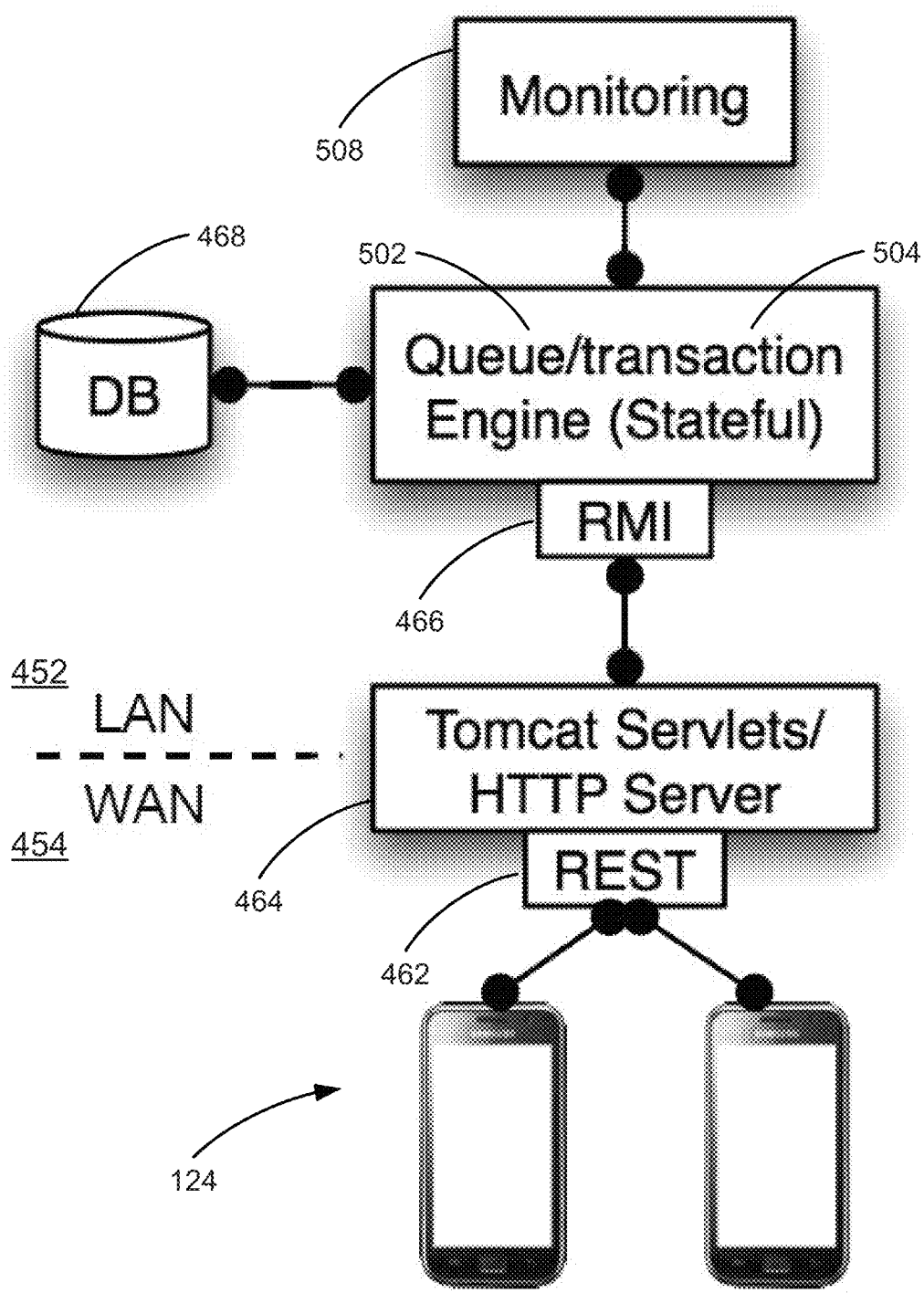
FIG. 4C is system block diagram of the virtual checkout queue system.
Figure 5:
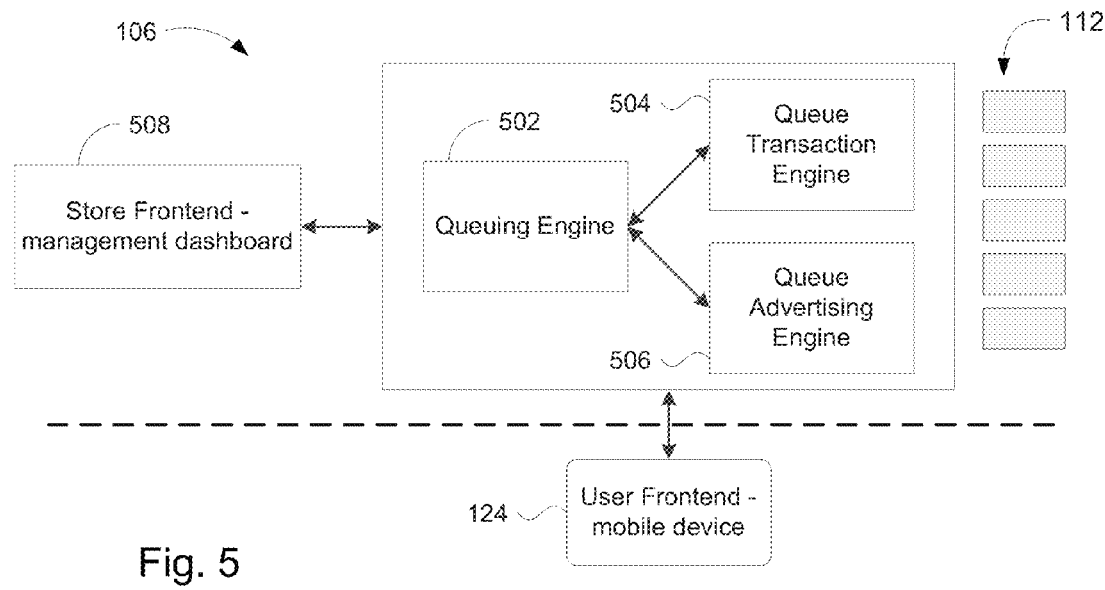
FIG. 5 represents a block diagram of the queue manager.

Referring to FIG. 4C and FIG. 5, an embodiment of a backend system that supports the virtual checkout queuing system in accordance with principles of the present invention includes publicly accessible components designated in the figure as a wide area network (WAN) 454 and retail-internal components designated in the figure as a local area network (LAN) 452. The WAN side 454 represents the side of the backend system that is accessible by the public, namely customers and in particular customer's mobile devices 124. The LAN side 452 represents retail information such as inventory and prices, configuration of the RFID readers 110, customer information, real time data such as customer locations, their positions in the checkout queues, and so on.

In embodiments, the interface between the LAN side 452 and the WAN side 454 may be representational state transfer (REST) style interface (referred to a REST-ful interface) 462 that is provided on an HTTP web server 464; for example, the Apache Tomcat web server. The web server 464 may be accessible by an device that supports the HTTP protocol. In embodiments, the following functions may be provided:

checkin: checking in to the system and getting an ID (e.g., anonymous or linked to loyalty card)

leave: leaving the system by revoking the user-ID from the store database.

checkout: requesting a checkout ticket, which adds the user to the virtual queue. If the function is called afterwards, status updates and transactions are transmitted.

cancel: cancels the ticket and removes the user from the queue.

On the LAN side 452, various internal processes are implemented. As will be explained below, a queuing engine 502 (FIG. 5) and a queue transaction engine 504 are provided. These are stateful process objects. The queuing engine 502 provides a Java® Remote Method Invocation (RMI) interface 466, over which the queue data structures can be accessed. Other functionalities include management of the queue transactions (queue transaction engine 504) and the pushing of the advertisements (queue advertising engine 506). The stateful data structures may be persisted in a database 468. A management dashboard 508 may be written with the Google Web Toolkit (GWT) to provide a manager of the retail establishment 102 with access to the stateful queue object for monitoring purposes.

Referring now to FIG. 5, a description of some details of the queue management system 106 in accordance with aspects of the present invention will be given. The mobile device 124 can communicate with the queue management system 106 in any of numerous ways. For example, Wi-Fi™ communications may be used. The queue management system 106 may communicate with the mobile device using text messaging, push technology, and so on, in addition to Wi-Fi™. As explained above, the queue management system 106 may monitor the customer 122, by way of their mobile device 124, as they shop. The queue management system 106 dispatches customers 122 to one or more checkout counters 112 in accordance with principles of the present invention.

In embodiments, the queue management system 106 includes various software components. A queuing engine 502 manages the virtual checkout queue(s). A queue transaction engine 504 provides services to customers to change their positions in the checkout queue. A queue advertising engine 506 provides services for fine-grained targeted advertising, recommendation notices, couponing, and so on. A store front-end user interface (UI) 508 provides access (e.g., display) of the real-time data circulating in the queuing system. For example, the flow of customers in the checkout queue can be monitored, including customers swapping slot positions in the queue. Activity relating to queue transactions may be displayed. The store front-end 508 may provide mechanisms (e.g., via a graphical user interface, GUI) to allow a manager of the retail establishment 102 to initiate or otherwise moderate queue transactions and customers' positions in the checkout queue, and other similar functions.

Queuing Engine

The queuing engine 502 includes conventional queuing functionality. For example, conventional queuing may involve a customer using their mobile device to place themselves in a virtual queue by texting a message. In embodiments, a customer may be similarly queued up in a checkout queue by pressing the checkout button (322, FIG. 3A) on their mobile device 124. Some time later, the customer gets a notification, e.g., via SMS messaging, to proceed.

Figure 6:
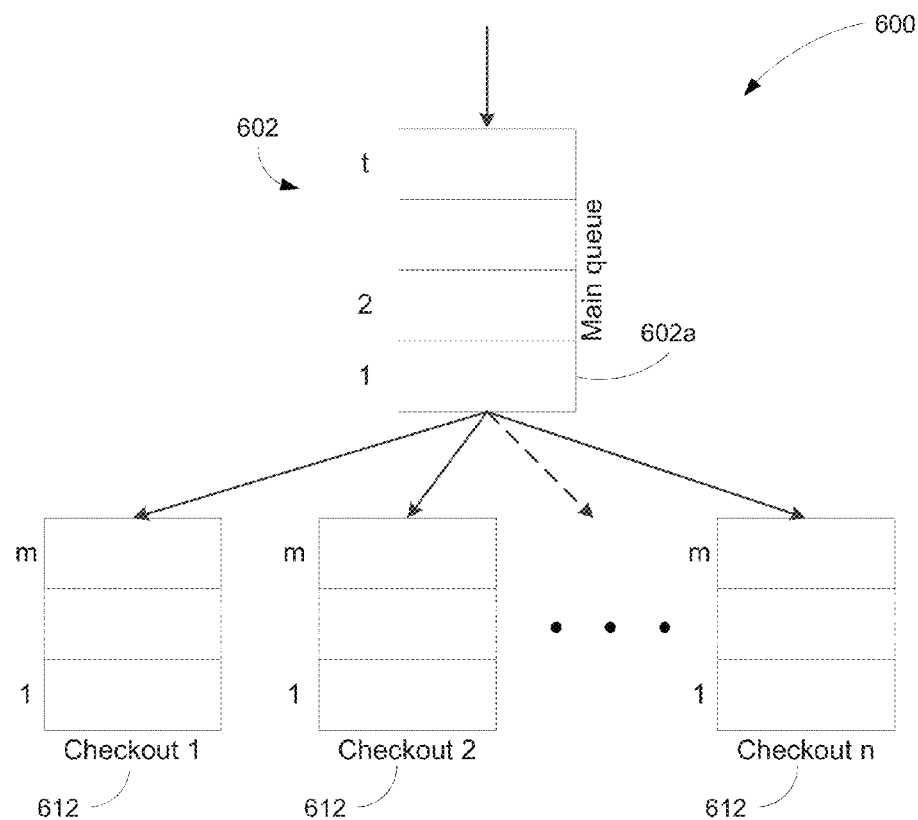
FIGS. 6 and 7 represent various queue structures.

FIG. 6 illustrates a queuing mechanism 600 in accordance with embodiments of the present invention that is maintained and operated on by the queuing engine 502. In an embodiment, the queuing mechanism 600 comprises a main checkout queue 602 having a capacity t, and n checkout counter queues 612 each having a capacity m. Suppose that the retail establishment 102 has $n_{tot}$ checkout counters in total, n represents the number of checkout counters that are open. Each checkout counter queue 612 has a capacity m, where m may be set to m=2. As mentioned above, it may be desirable to dispatch at least two customers to a checkout counter in order to avoid idle time that may diminish the efficiency of the system.

In embodiments, a customer entering the checkout queue is enqueued to the main checkout queue 602. For example, the queues 602, 612 may be implemented using suitable data structures in a computer memory. Enqueuing a customer may be performed by storing an identifier of the customer into the data structure. When a customer at the head of the main checkout queue 602*a* is dispatched to a checkout counter, the customer may be dequeued from the main checkout queue and enqueued to one of the checkout counter queues 612. A notification is then communicated the customer's mobile device, informing the customer to proceed to the corresponding checkout counter 112.

Figure 7:
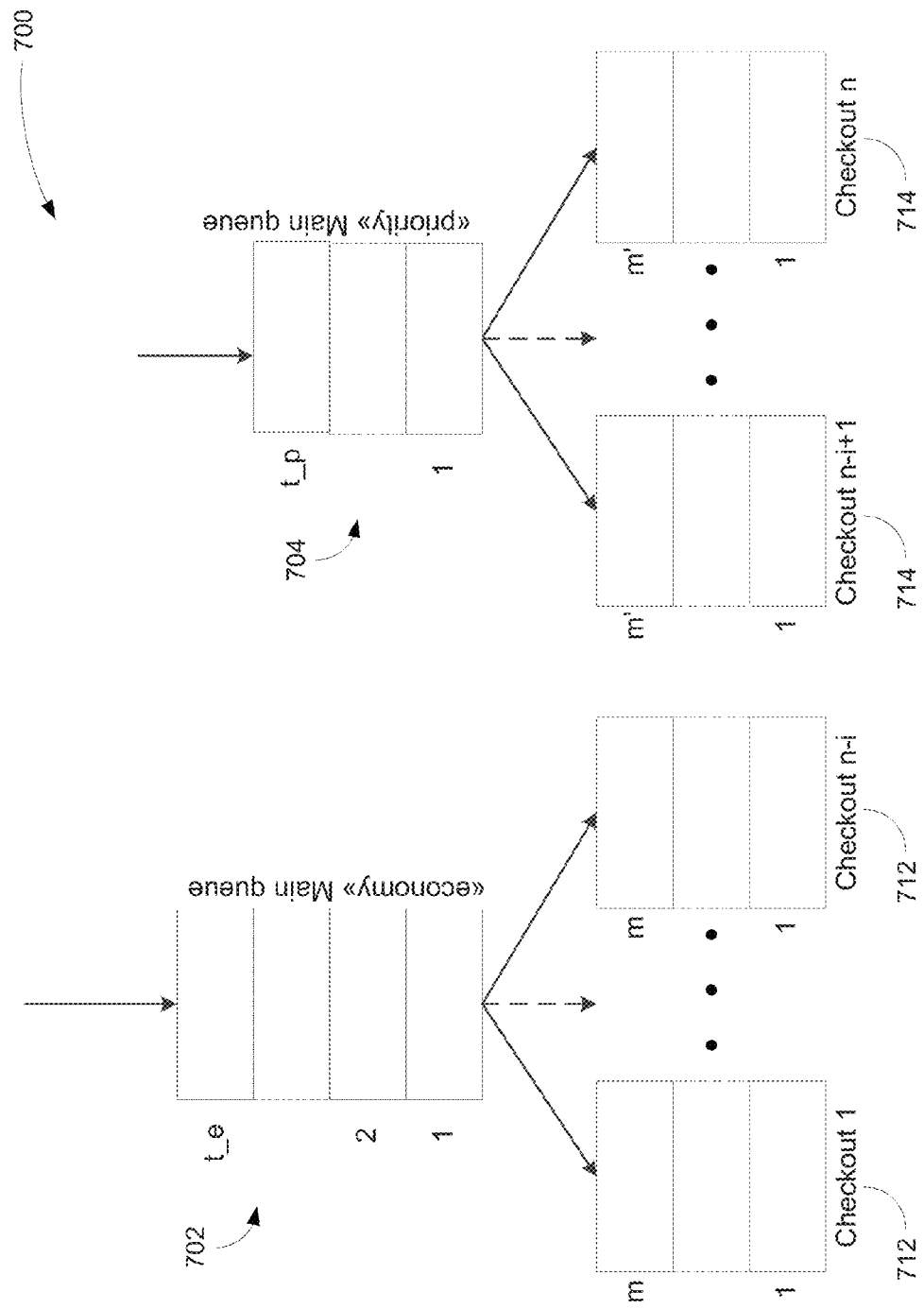

Referring now to FIG. 7, in embodiments, a second main queue may be provided. For example, the second main queue may be for "priority" users. Accordingly, as illustrated in FIG. 7, in an embodiment, the queuing engine 502 may maintain a queuing mechanism 700 comprising a first main queue called an "economy" main queue 702 and a second main queue called a "priority" main queue 704. The n open checkout counters may be apportioned to economy customers and priority customers. Accordingly, the economy main queue 702 will be associated with checkout counter queues 712, and similarly the priority main queue 704 will be associated with checkout counter queues 714. The queue depths m, m' may or may not be the same. For example, in an embodiment, m=2, and m'=1.

The queuing engine 502 may automatically open and close checkout counters depending on the average waiting time per customer. The capacity of the main queue 602 may be used to establish a threshold (e.g., 0.8t) to open a new checkout. If the number of customers in the main queue 602 reaches or exceeds the threshold, and if a new checkout counter is available (i.e., $n<n_{tot}$), then the queuing engine 502 may notify an employee to open a checkout counter. In contrast, if the number of customers in the main queue 602 falls below a second, minimum threshold (e.g., 0.6t), the queuing engine 502 may signal that a checkout counter should be closed. In embodiments, the queuing engine 502 may separately manage opening and closing of "economy" checkout counters and "priority" checkout counters.

Queue Transaction Engine

In accordance with aspects of the present invention, the queuing system is dynamic in that customers who are enqueued may negotiate with each other for a new position (or slot) in the checkout queue. The queue transaction engine 504 manages several mechanisms in which a customer can get priority in the checkout queue by negotiating a higher position in the queue. The queue transaction engine 504 may also be used by the customer to negotiate a lower position the queue. Accordingly, an interactive asynchronous mechanism may be provided to allow a customer who desires higher priority in the checkout queue to place an offer. Other customers in the checkout queue may receive the offer and accept it. Following is a more detailed description of this aspect of the present invention.

Figure 8:
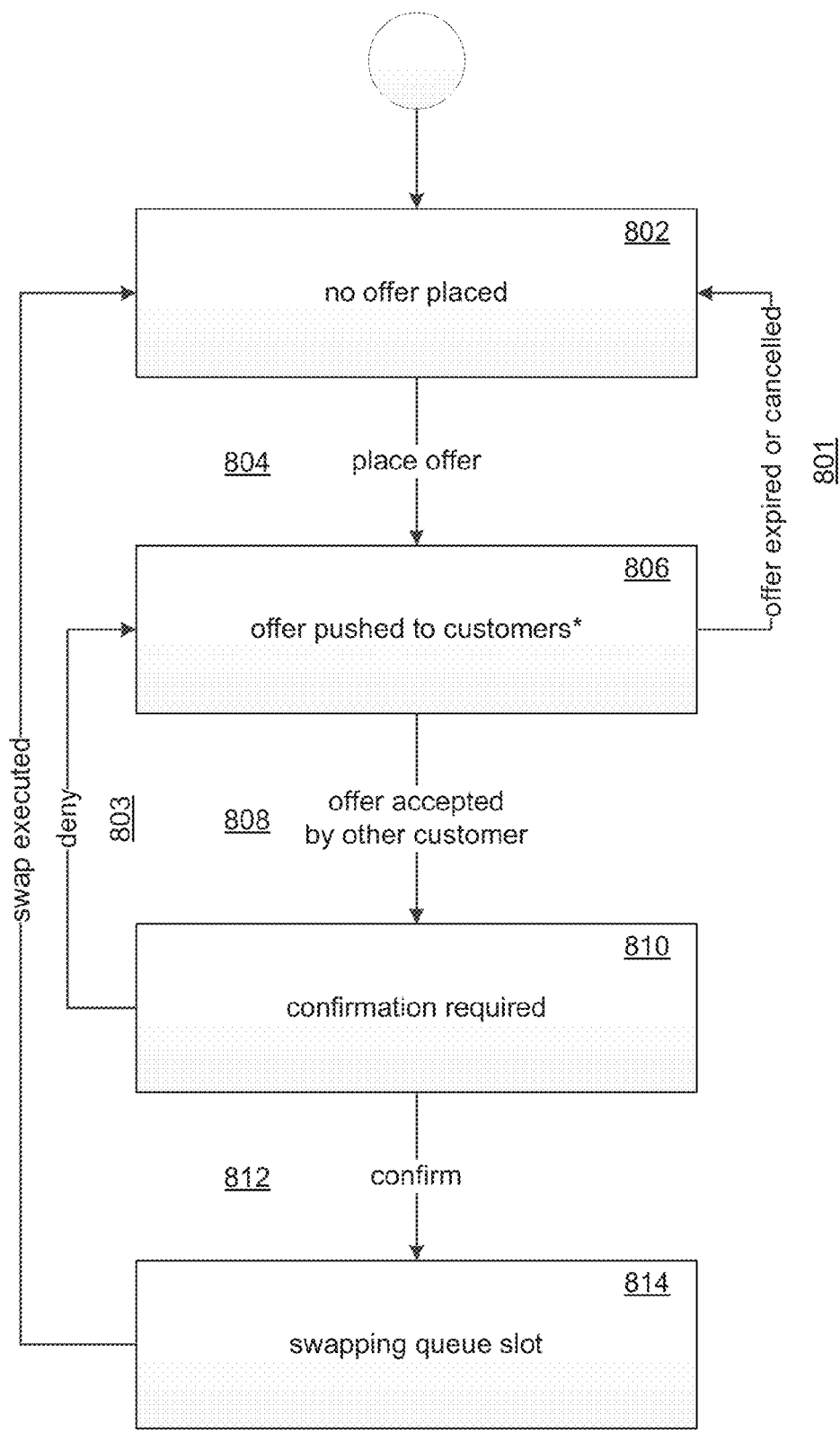
FIGS. 8 and 9 illustrate flows for a queue transaction.

FIG. 8 shows an illustrative example for placing a transaction offer in accordance with the present invention. A customer $c_i$ may make an offer $O_i$ which comprises the triplet:

$$O_i = (t_i, t_i^{max}, m_i),$$

where $t_i$ is the customer $c_i$'s current wait time in the checkout queue,
$t_i^{max}$ is the customer $c_i$'s desired maximum wait time, and
$m_i$ is an amount of "currency" that the customer $c_i$ is willing to pay.

In embodiments, the "currency" may be real money, or loyalty points that are redeemable in the retail establishment, coupon offers, and so on. FIG. 8 depicts the life cycle of a customer $c_i$'s offer $O_i$.

As an entry point, 802 indicates that no offer has been made. After the offer $O_i$ is made (804) by customer $c_i$, the offer may be pushed (806) to customers in the checkout queue who "match" the offer. To determine a "matching" customer, consider an arbitrary customer $c_j$ and the offer $O_i = (t_i, t_i^{max}, m_i)$. In an embodiment, the offer $O_i$ may be deemed to "match" customer $c_j$ if and only if $$t_j \leq t_i^{max},$$

where $t_j$ is customer $c_j$'s current wait time in the checkout queue.

The offer $O_i$ remains valid until it is canceled (801). The customer $c_i$ may explicitly cancel the offer $O_i$. Alternatively, the offer $O_i$ may be canceled as a result of "expiration" of the offer. In embodiments, the offer $O_i$ may be deemed to have expired when, $$t_j \leq t_i^{max} + \epsilon, \epsilon \geq 0,$$

where $\epsilon$ is a configurable parameter that is used to specify a margin to the expiration time of an offer.

If an offer $O_i$ is accepted (808) by a customer, the customer $c_i$ will receive a confirmation request (810). For example, the mobile device of a customer who receives an offer may be presented with an "accept" button. Pressing the accept button can send a suitable message to the queue transaction engine 504 indicating an acceptance of the offer. The queue transaction engine 504, in response, may send or push a message to the offeror indicating an acceptance of the offer In embodiments, the customer $c_i$ may be required to confirm (812) the acceptance of the offer or deny (803) the acceptance of the offer. If the acceptance of the offer is confirmed, then the queue positions of the customer $c_i$ is swapped with the queue position of the customer who accepted the offer. The queue transaction engine 504 may send an update message to customers who had received the offer in order cancel the offer, or otherwise remove it, thus terminating the life cycle of the offer $O_i$. If the customer $c_i$ denies the acceptance of the offer, then the offer $O_i$ will persist and remain available for a customer to accept it, until the offer is explicitly canceled or expires.

Figure 9:
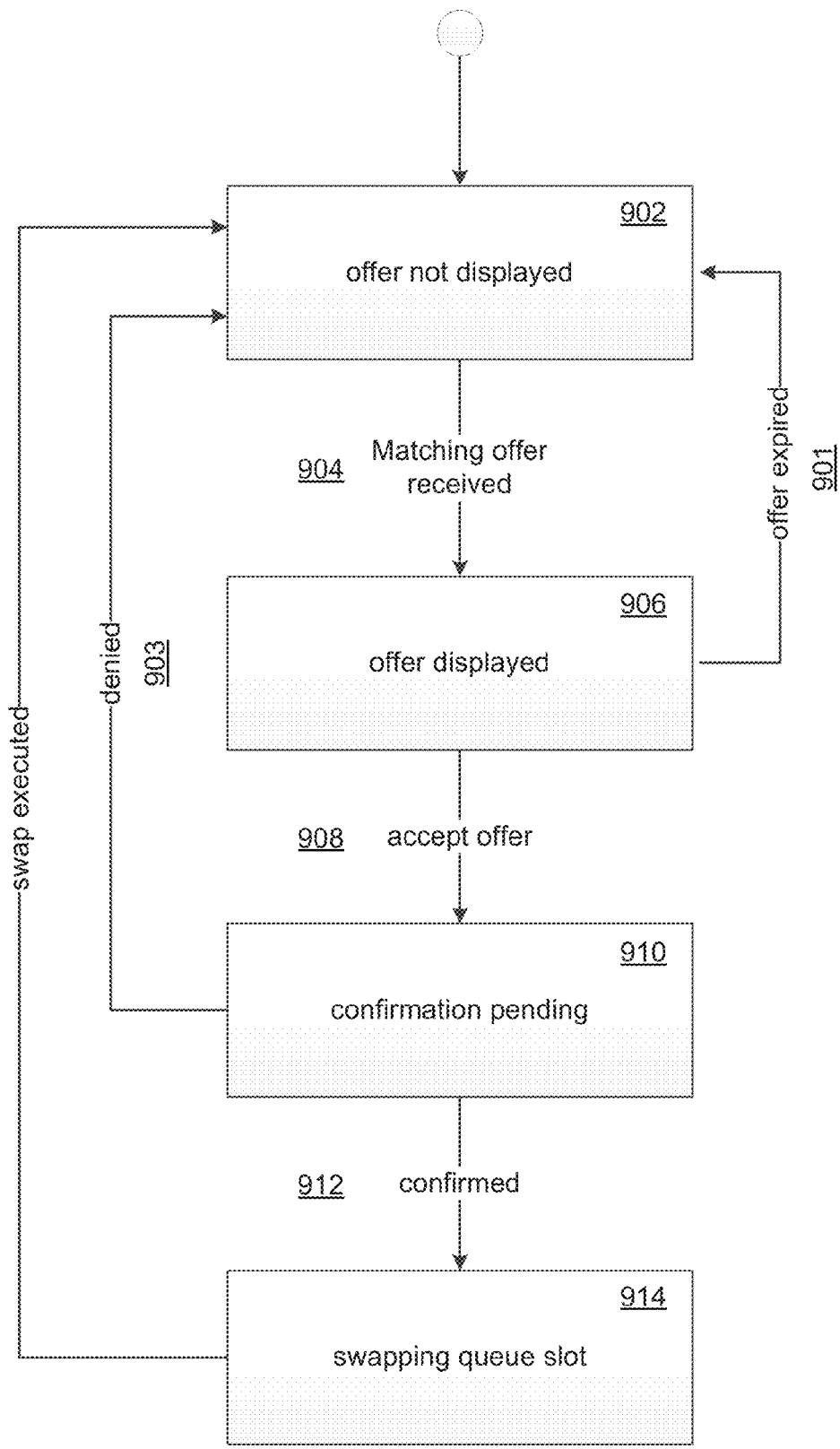

FIG. 9 shows an illustrative example for receiving a transaction offer in accordance with the present invention. An example of the conditions for a customer to receive an offer $O_i$ has been discussed. Consider now the point of view of a customer $c_j$ who receives an offer $O_i$. FIG. 9 depicts the life cycle of a received offer $O_i$.

As a starting point (902), an offer is not being displayed on the mobile device of the customer $c_j$. If an offer $O_i$ has been made that matches the customer $c_j$ (e.g., the condition $t_j \leq t_i^{max}$ is satisfied for $c_j$), then a message may be sent (e.g., SMS text, pushed, etc.) to customer $c_j$'s mobile device, informing customer $c_j$ of receipt (904) of the offer $O_i$. The offer $O_i$ may be displayed (906) on customer $c_j$'s mobile device. For example, suppose in the offer $O_i$, $t_i^{max}$ is "5 minutes" and $m_i$ is "1 Franc", a corresponding offer message may be presented on customer $c_j$'s mobile device in the form of an inquiry such as "Do you want to receive 1 Franc and wait 5 minutes?" The offer message may expire (901) for customer $c_j$ if $t_j > t_i^{max}$, after which time the offer $O_i$ will no longer be displayed on customer $c_j$'s mobile device.

If customer $c_j$ accepts the offer (908), then they have to wait until the customer who made the offer confirms the acceptance (912). After confirmation is received, then the queue transaction engine 504 will swap slots (914) as discussed above. If the acceptance is not confirmed (denied, 903), then the offer message will be deleted from customer $c_j$'s mobile device.

When a transaction has concluded with a swapping of queue positions, the offered "currency" must be settled between the customer $c_i$ (offeror) and customer $c_j$ (offeree). Suppose $c_i$ and $c_j$ negotiated on swapping their respective queue positions for an amount $m_i$. Accordingly, $c_i$ must "pay" $c_j$. In an embodiment, an indirect billing mechanism may be employed to effect payment between $c_i$ and $c_j$. When $c_i$ approaches the physical checkout counter, the amount m, is added to $c_i$'s bill Likewise, when $c_j$ approached the physical checkout counter, the amount $m_i$ is deducted from $c_j$'s bill. In this way, the entire queue transaction remains virtual; no direct interaction between $c_i$ and $c_j$ need occur, not even for the currency exchange.

The foregoing describes the queue transaction engine 504 mediating queue transactions between customers. In accordance with the present invention, the queue transaction engine 504 may mediate queue transactions between a customer and the retailer. Implicit queue transactions may be defined where no action by the customer is required to gain priority in the checkout queue. In embodiments, the customer's state may trigger the queue transaction engine 504 to move the customer toward the head of the checkout queue. If a priority checkout counter is open, then the customer may be moved to a "priority" checkout queue. State information may comprise any data that may be collected about the customer's shopping habits. For example, state information may include how often the customer shops at the retail establishment 102, how much the customer typically spends, whether the customer tends to purchase high profit margin items, and so on. The state information may include information about the customer other than their shopping habits; e.g., who they are, their profession, and so on.

In embodiments, the queue transaction engine 504 may mediate explicit transactions between the customer and the retailer. For example, the customer may initiate a queue transaction to negotiate an improvement of their position in the checkout queue. The customer may be in possession of a "queue upgrade" coupon that the retailer had previously distributed as a marketing tool that can be used to move up in the checkout queue. In embodiments, either the customer or the retailer may offer a queue transaction to be moved to a lower position in the checkout queue. For example, the customer may be given loyalty points or actual money as an incentive to be pushed toward the end of the checkout queue, thus moving other customers toward the head of the queue that much faster. The retailer may employ this strategy when the checkout counters are heavily loaded (for example, during peak hours).

Queue Advertising Engine

Figure 10:
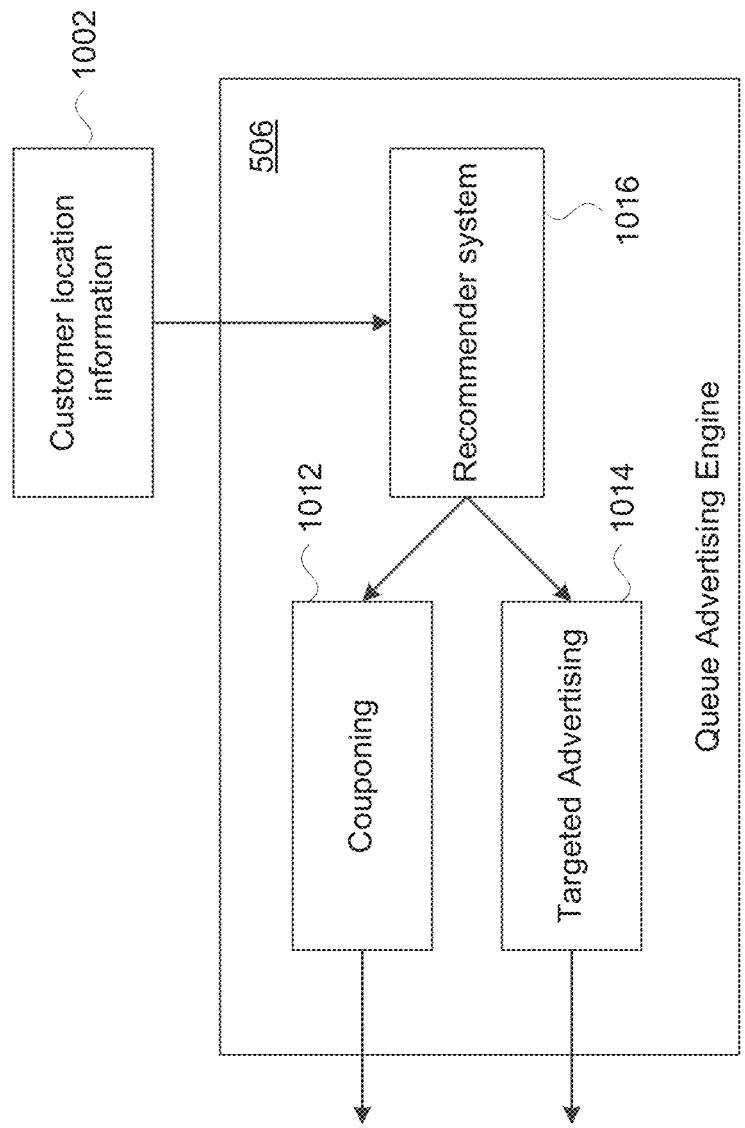
FIG. 10 represents a block diagram for pushing ads.

After a customer is ready to check out, the task of the queue advertising engine 506 is to push coupons or targeted ads to them. Those pushed offers are intended to trigger impulsive purchases of complementary products. In embodiments, the queue advertising engine 506 may comprise component is illustrated in FIG. 10. A couponing component 1012 and a targeted advertising component 1014 may push offers to the customer's mobile device. A recommender system 1016 may feed couponing or advertising information to the couponing component 1012 and the targeted advertising component 1014. The recommender system 1016 may perform product filtering based on the profile information for the customer.

While conventional retailers locate their "impulse purchase" items near the checkout counter, retailers incorporating an embodiment of the present invention on their premises can place such goods anywhere and thus enjoy greater flexibility in the use of their space. Accordingly, location information 1002 of the customer feeds into the recommender system 1016. As indicated in FIG. 1, a source of location information 1002 may be the RFID readers 110 located throughout the premises of the retail establishment 102. Customers may have on their person a membership card that bears an RFID chip. Customers may be handed a tracking device upon entering the premises. In an embodiment, a GPS component in the customer's mobile device may provide location information to a mobile app that feeds the location information to the recommender system 1016. The recommender system 1016 may feed couponing and/or advertising data to the couponing component 1012 and the targeted advertising component 1014 based on the location information 1002 in conjunction with knowledge about the location of goods in the retail establishment 102.

Store Front-End User Interface

Figure 11:
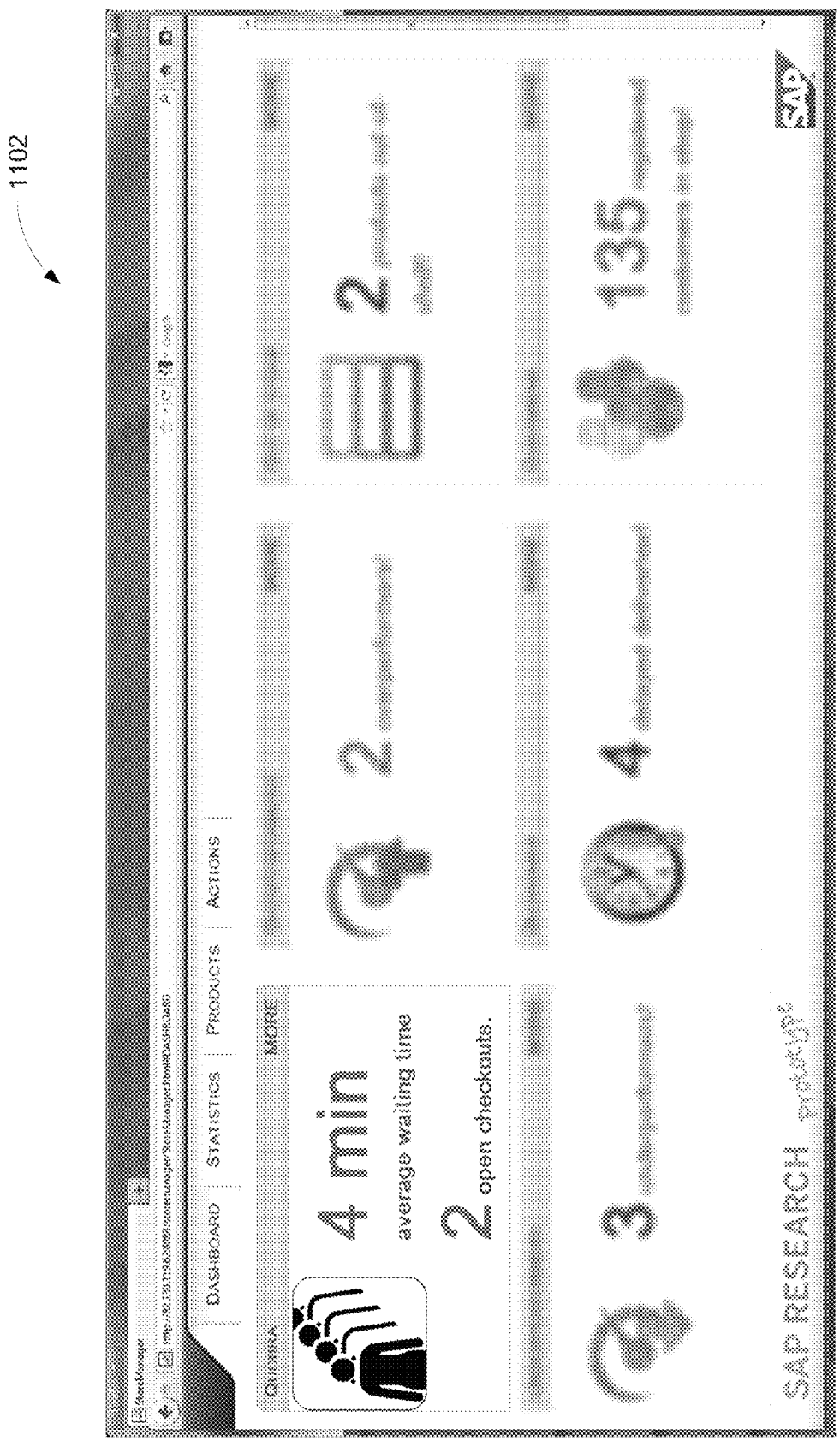
FIG. 11 illustrates an example of a monitor for the queue manager.

FIG. 11 illustrates a user interface (UI) 1102 that allows a manager of the retail establishment 102 to monitor the status of the virtual checkout queuing system of the present invention. In embodiments, the system's real time data may be extracted and processed for monitoring purposes via the UI 1102. For example, the UI 1102 may display information such as average wait time and the number of open physical checkout counters. As can be seen in the screen shot, the UI 1102 may emphasize this information by blurring out the other information, leaving in focus the information of interest. Such information may inform the manager about the checkout situation and allow them to take remedial action; e.g., open another checkout, initiate queue transaction with customers, etc. The UI 1102 may provide other management functions such as granting customers with priority, open and close checkout counters, and so on.

Mobile Application User Interface

FIGS. 12-17 illustrate screen shots from a mobile device 124 programmed by a mobile application 302 to operate in accordance with principles of the present invention. In a particular embodiment, the mobile device 124 is a smart phone, and more specifically a smart phone running the Google® Android® operating system.

Figure 14:
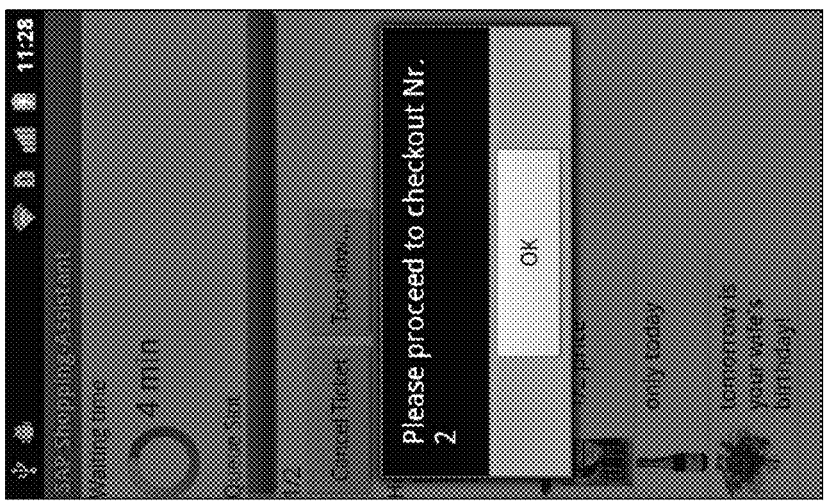
FIGS. 12-17 depict screen shots of a mobile device in accordance with the present invention.
Figure 13:
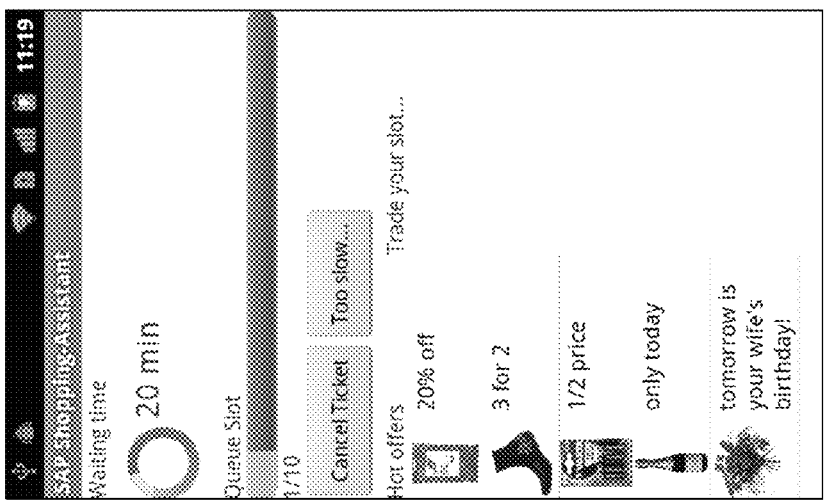
Figure 12:
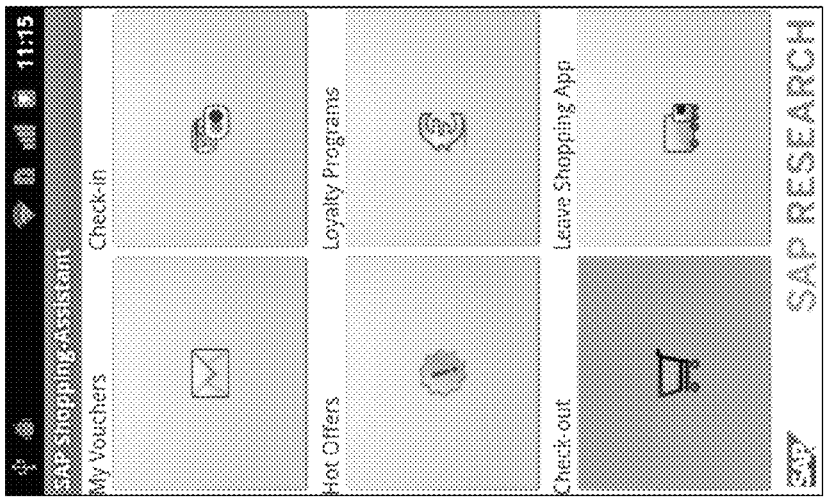

The screen shots shown in FIGS. 12-14 illustrate a checkout sequence. FIG. 12 shows a home screen that the mobile application 302 may display. Various buttons may be presented; for example, a Check-in button allows the customer to register themselves with the retailer's virtual checkout queuing system. FIG. 12 shows the Check-out button has been pressed, displayed in a darker shade of color than the other buttons. Pressing the Check-out button initiates processing explained above. In response, the mobile application 302 will change the display to show the assigned queue position.

FIG. 13 shows an example of screen shot of such a display. The display informs the customer that their wait time is currently 20 minutes. In embodiments, the queue management system 106 may push new time values to the mobile device 124. For example, each time the queue advances, or every minute, and so on. The screen shot may include a graphic that informs the customer of their slot position in the checkout queue. Again, the graphic may update each time the queue advances. The figures shows that the checkout queue is ten deep and that there is only one customer in the queue. Additional information may be displayed. For example, the customer may be informed of various purchasing opportunities.

FIG. 14 is a screen shot of a display that may be presented to the customer when their turn at the checkout counter arrives. For example, a message may be displayed informing the customer to proceed to a specified checkout counter. An OK button may be provided so the customer can provide positive confirmation that they received the message and in fact are heading to the checkout counter.

Referring back to FIG. 13, in embodiments, a button to initiate a queue transaction may be displayed. In the figure, a "Too slow" button informs the customer that they may trade their slot. When the "Too slow" button is pressed, the display may be updated to show a queue transaction screen, such as illustrated by the screen shot in FIG. 15. As can be seen, a customer identified as "customer 1" is prompted to enter the parameters of the offer of the queue transaction; e.g., a maximum wait time and a bid amount. In the example shown in FIG. 15, the customer has specified that they are wanting to wait at most 6 minutes and are willing to pay 100 units of currency as the bid amount. Radio buttons may be provided to allow the customer to designate the unit of currency. In an embodiment, this may be "cents" or "loyalty points." The customer may submit the queue transaction offer by pressing the OK button.

Figure 16:
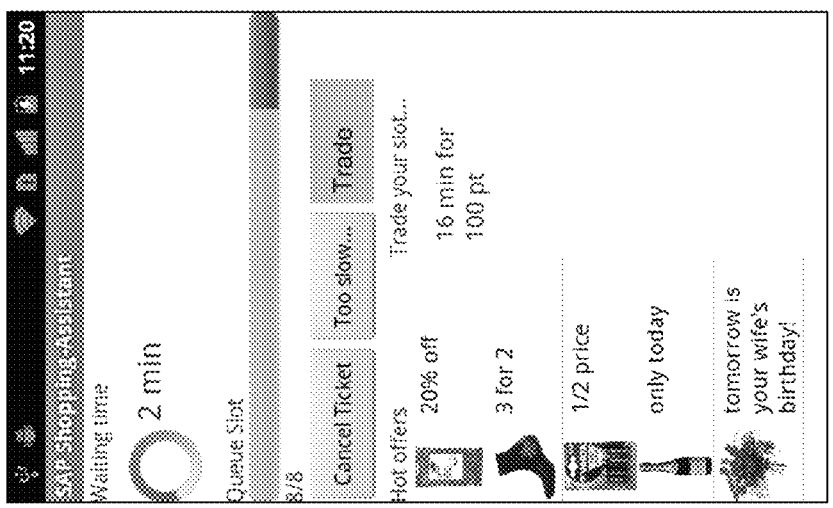
Figure 15:
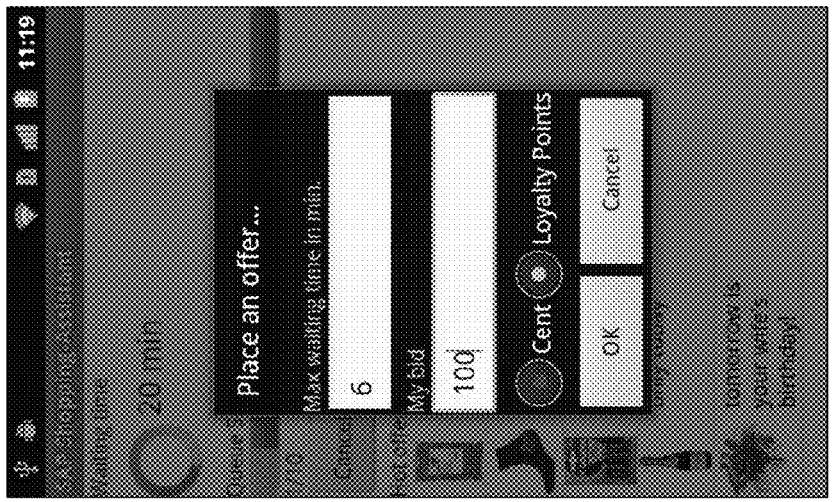

The offer may be pushed to one or more matching customers, as explained above. FIG. 16 shows a screen shot of a display that a matching customer "customer 2" may show on their mobile device. As FIG. 16 shows, customer 2, who has a wait time of only two minutes, is presented with an offer to receive 100 loyalty points in exchange for waiting 16 minutes. A Trade button is displayed on customer 2's display.

In an embodiment, the computation of the amount of time offered to customer 2 may proceed as follows. Customer 1's current wait time is 20 minutes; however, customer 1 wishes to eliminate 14 minutes from that wait so that their wait time is at most 6 minutes. Thus, customer 1 needs to get rid of 14 minutes. Therefore, the offer made to customer 2 is to increase their wait time by 14 minutes. Accordingly, the offer made to customer 2 is for a new wait time of 16 minutes (14 from customer 1 plus the current amount of 2).

Figure 17:
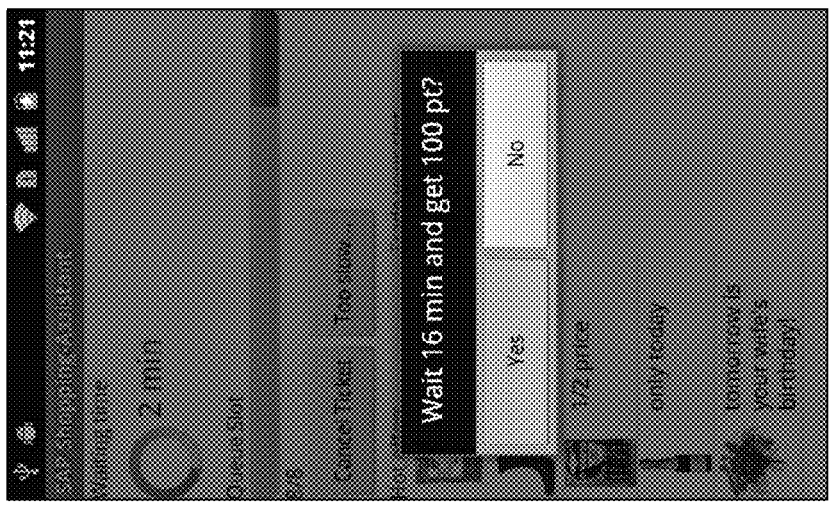

FIG. 16 shows that customer 2 has pressed the Trade button (darkened color) in order to accept the offer. FIG. 17 shows a screen shot of a prompt to customer 2 to confirm that they accept the offer. Processing proceeds as set forth in FIGS. 8 and 9. The queue transaction concludes with customer 1 and customer 2 swapping their slot positions in the checkout queue.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method for checkout processing in a retail establishment comprising:
    a mobile device of a first user transmitting to a server a checkout request message;
    the mobile device receiving from the server a queuing message comprising information indicative of a position in a checkout queue;
    conducting a queue transaction process between the first customer and one or more transactors, including the server identifying the one or more transactors who match an offered position in the checkout queue and an offered compensation amount and sending the offered position and offered compensation amount to the one or more transactors, the offered position being a position desired by the first customer, the offered compensation amount being an amount that the first customer is willing to exchange the offered position with a transactor; and
    concluding the queue transaction process with one of the one or more transactors, including the server exchanging respective queue positions of the first customer and said one of the one or more transactors and transmitting new queue positions to the first customer and to said one of the one or more transactors.

2. The method of claim 1 wherein conducting a queue transaction process comprises the mobile device receiving the offered position in the checkout queue and the offered compensation of a first transactor, wherein concluding the queue transaction process comprises sending an acceptance of the offered position in the checkout queue and the offered compensation amount.

3. The method of claim 1 wherein the one or more transactors includes a retailer of the retail establishment.

4. The method of claim 1 further comprising operating the mobile device to perform a step of receiving information for goods or services offered in the retail establishment.

5. The method of claim 1 the queuing information further indicative of a queue wait time.

6. A mobile device of a first customer comprising a processing unit and a memory, the memory having stored therein executable program code, the executable program code configured to cause the processing unit to:
    transmit to a server a checkout request message;

receive from the server a queuing message comprising information indicative of a position in a checkout queue;

conduct using the server a queue transaction process between the first customer and one or more transactors, wherein the server identifies the one or more transactors who match an offered position in the checkout queue and an offered compensation amount and sending the offered position and offered compensation amount to the one or more transactors, the offered position being a position desired by the first customer, the offered compensation amount being an amount that the first customer is willing to exchange the offered position with a transactor;

conclude with the server the queue transaction process with one of the one or more transactors, wherein the server exchanges respective queue positions of the first customer and said one of the one or more transactors and transmits new queue positions to the first customer and to said one of the one or more transactors.

7. The mobile device of claim 6 wherein the mobile device receives the offered position in the checkout queue and the offered compensation of a first transactor and sends an acceptance of the offered position in the checkout queue and the offered compensation amount to the server.

8. A method for a virtual checkout queue comprising operating a computer system to perform steps of:

receiving a checkout request from a customer of a retail establishment of a retailer;

assigning the customer to a queue position in a checkout queue;

advancing the customer's queue position toward a head of the checkout queue as other customers in the checkout queue are removed therefrom when they are processed at a checkout counter;

informing the customer to proceed to a checkout counter by sending a checkout summons message to the customer when the customer's queue position is at the head of the checkout queue;

mediating a queue transaction on behalf of the customer prior to the customer's queue position being at the head of the checkout queue, including:

identifying the one or more transactors who match an offered position and an offered compensation amount; and sending the offered position and offered compensation amount to the one or more transactors, the offered position being a position desired by the first customer, the offered compensation amount being an amount that the first customer is willing to exchange the offered position with a transactor; and concluding the queue transaction with one of the one or more transactors, including exchanging respective queue positions of the first customer and said one of the one or more transactors and transmitting new queue positions to the first customer and to said one of the one or more transactors.

9. The method of claim 8 wherein said one of the one or more transactors is another customer of the retail establishment.

10. The method of claim 8 wherein said one of the one or more transactors is the retailer.

11. The method of claim 8 further comprising an additional checkout queue, wherein the step of assigning the customer to a queue position comprises: assigning the customer to a queue position in the checkout queue if the customer does not satisfy a first predetermined criterion; and assigning the customer to a queue position in the additional checkout queue if the customer does satisfy the first predetermined criterion.

12. The method of claim 8 further comprising an additional checkout queue, wherein the step of assigning the customer to a queue position comprises assigning the customer to a queue position in the checkout queue, the method further comprising subsequently assigning the customer to a queue position in the additional checkout queue.

13. The method of claim 8 further comprising activating at least an additional checkout counter if a number of customers in the checkout queue increases beyond a first predetermined value, and deactivating a checkout counter if a number of customers in the checkout queue falls below a second predetermined value.

14. The method of claim 8 further comprising receiving location information indicative of a location of the customer in the retail establishment and sending one or more messages relating to the sale of goods or services which are selected based on the location information and the customer's queue position in the checkout queue.

15. The method of claim 14 wherein the one or more messages include offers for goods.

16. The method of claim 14 wherein the one or more messages include coupons for goods.

* * * * *